United States Patent [19]
Suzuki et al.

[11] Patent Number: 4,760,479
[45] Date of Patent: Jul. 26, 1988

[54] CASSETTE MAGNETIC RECORDING AND REPRODUCING DEVICE EMPLOYING A SINGLE REVERSIBLE MOTOR

[75] Inventors: Takashi Suzuki, Tokyo; Kaoru Watanabe, Yokohama; Masataka Kaneda, Machida; Shuji Nakame; Syogo Nakayama, both of Yokohama, all of Japan

[73] Assignee: Matsushita Electric Industrial Co., Ltd., Osaka, Japan

[21] Appl. No.: 809,404

[22] Filed: Dec. 16, 1985

[30] Foreign Application Priority Data

| Dec. 17, 1984 | [JP] | Japan | 59-265760 |
| Dec. 18, 1984 | [JP] | Japan | 59-266687 |
| Dec. 18, 1984 | [JP] | Japan | 59-266688 |
| Dec. 18, 1984 | [JP] | Japan | 59-266689 |
| Dec. 20, 1984 | [JP] | Japan | 59-269796 |

[51] Int. Cl.$^4$ .................. G11B 5/54; G11B 15/00
[52] U.S. Cl. .................................. 360/105; 360/93
[58] Field of Search ............... 360/90, 97.99, 74.1, 360/93, 96.1–96.5, 105

[56] References Cited

U.S. PATENT DOCUMENTS

| 4,346,414 | 8/1982 | Osanai | 360/90 |
| 4,358,800 | 11/1982 | Shimizu et al. | 360/90 |
| 4,419,702 | 12/1983 | Tanaka | 360/74.1 |
| 4,423,445 | 12/1983 | Okada et al. | 360/96.5 |

FOREIGN PATENT DOCUMENTS

| 134344 | of 1981 | Japan |  |
| 58-97155 | 6/1983 | Japan | 360/93 |

*Primary Examiner*—John H. Wolff
*Attorney, Agent, or Firm*—Spencer & Frank

[57] ABSTRACT

Disclosed is a magnetic recording and reproducing device which comprises a reversible motor, a first gear fixed to the shaft of the motor, a second gear and a pulley rotatably supported by the shaft of the motor, a first one-way clutch for transmitting the torque of the first gear to the second gear only when the motor is operating forwardly, a second clutch mechanism for transmitting the power of the first gear to the pulley only when the motor is operating backwardly, a cassette transfer mechanism engageable with the first gear, a magnetic tape running mode switching mechanism engageable with the second gear, and a magnetic tape running mechanism engageable with the pulley, whereby a plurality of mechanisms are driven by a single motor.

11 Claims, 20 Drawing Sheets

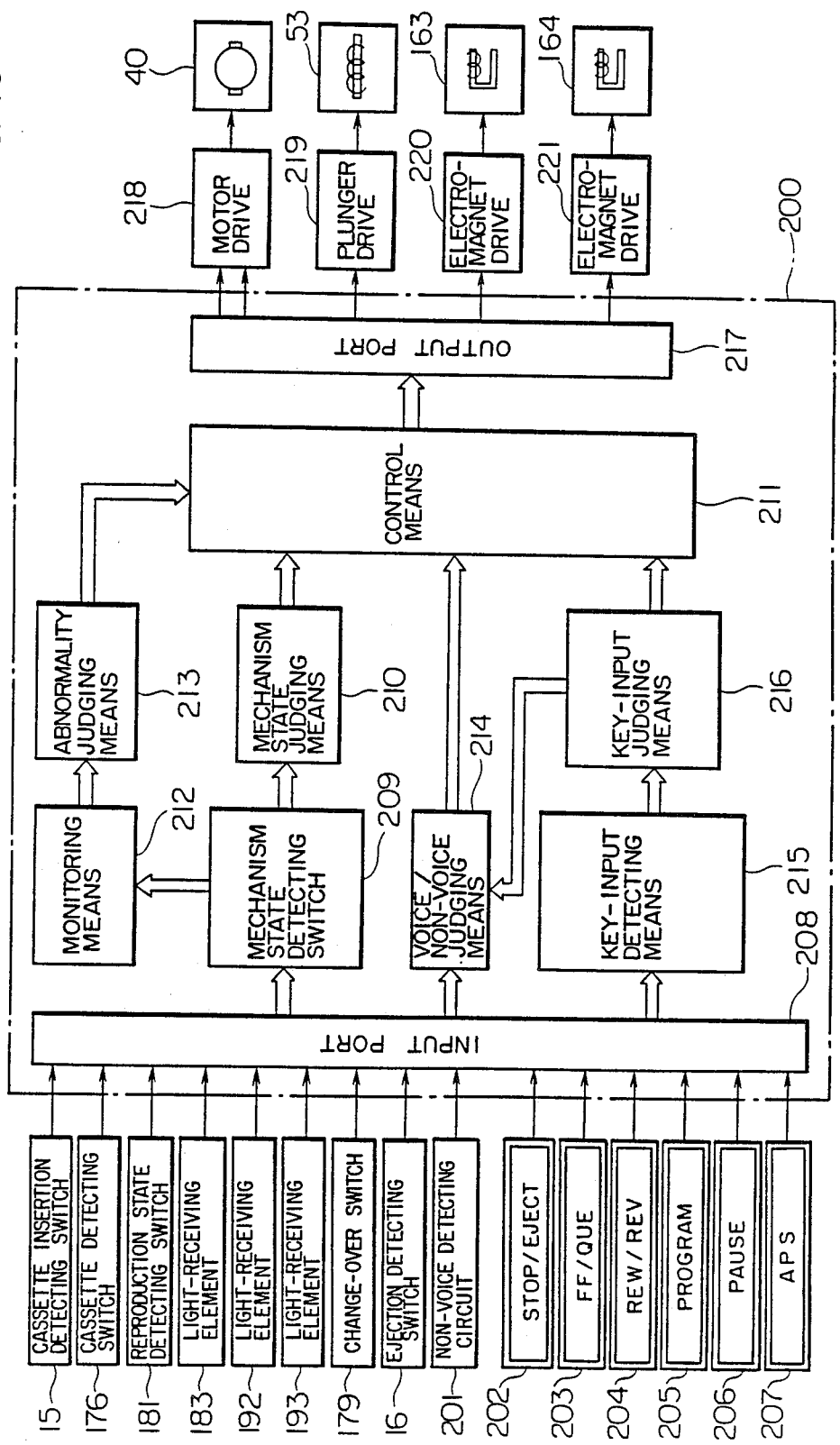

CASSETTE MAGNETIC RECORDING AND REPRODUCING DEVICE EMPLOYING A SINGLE REVERSIBLE MOTOR

BACKGROUND OF THE INVENTION

The present invention relates to a magentic recording and reproducing device which employs a cassette case surrounding a magnetic tape. Throughout the specification, the term "magnetic recording and reproducing device" is used to cover also such devices as being capable of performing only reproduction.

OBJECTS OF THE INVENTION

An object of the present invention is to provide a magnetic recording and reproducing device in which the driving of a magnetic tape running system, switching of the magnetic tape running mode and the transfer of the cassette are performed by a single motor.

Japanese Unexamined Patent Publication No. 134344/1981 discloses a magnetic recording and reproducing device in which a magnetic tape running system is driven by forward operation of a motor, while the power derived from backward operation of the motor is utilized in the switching of the running direction of the magnetic tape.

This known device, however, does not make full use of the driving power of the motor, because the motor performs only the driving of the tape running system and the switching of the tape running direction.

The present invention proposes a magnetic recording and reproducing device in which a single motor performs transfer of a cassette, besides driving of a magnetic tape running system and switching of magnetic tape running modes, thereby obviating the above-described problems of the prior art.

A second object of the invention is to provide a magnetic tape recording and reproducing device having a cassette transfer mechanism which is capable of transferring a cassette both in horizontal and vertical directions, without applying any large force to the cassette.

A typical known cassette transfer mechanism of the kind described above incorporates a pair of lifter plates urged in a closing direction by a resilient member. This cassette transfer mechanism is used in combination with a cassette pressing mechanism which is adapted to press a cassette on the lifter plates downwardly into a recording or reproducing position.

This known arrangement, however, requires that a force greater than the biasing force of the resilient member acting on the lifter plates be applied to the cassette and, hence, tends to cause deformation of the cassette under action of heat. The present invention obviates this problem.

A third object of the invention is to provide a magnetic recording and reproducing device having a tape running direction switching mechanism of a simple construction and capable of accommodating dimensional errors of constituent parts.

A fourth object of the invention is to provide a magnetic recording and reproducing device in which a tape running direction switching mechanism and a head chassis driving mechanism are incorporated in a common system to simplify the construction.

A fifth object of the invention is to provide a magnetic recording and reproducing device which is improved to simplify constructions of various mechanisms such as a head chassis retaining mechanism for retaining a head chassis at reproducing or recording positions when reproducing or recording is performed, a retracting mechanism for slightly retracting the head chassis during fast forwarding FF or rewinding REW, and FF-REW switching control mechanism for switching the direction of tape running during FF and REW operations.

A sixth object of the invention is to provide a magnetic recording and reproducing device having a mechanism which is capable of detecting whether a cassette has been set in a correct reproducing or recording position and, when the cassette is not correctly set, ejecting the cassette.

BRIEF DESCRIPTION OF THE DRAWINGS

FIG. 15 is a block diagram of a control system of the device;

DESCRIPTION OF THE PREFERRED EMBODIMENT

Figure 1:
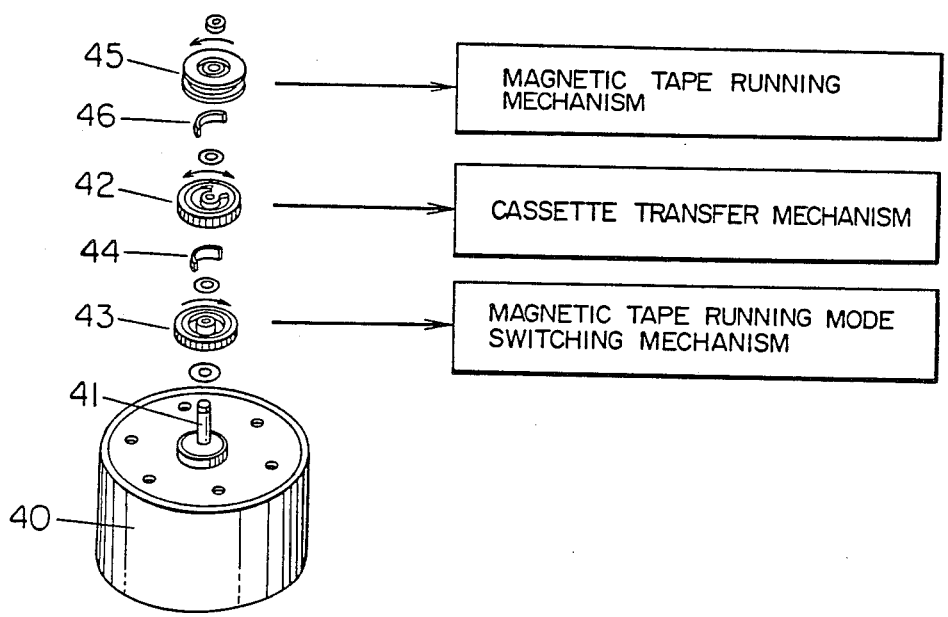
FIG. 1 shows a schematically fundamental construction of a device according to an embodiment of the invention.
Figure 2:
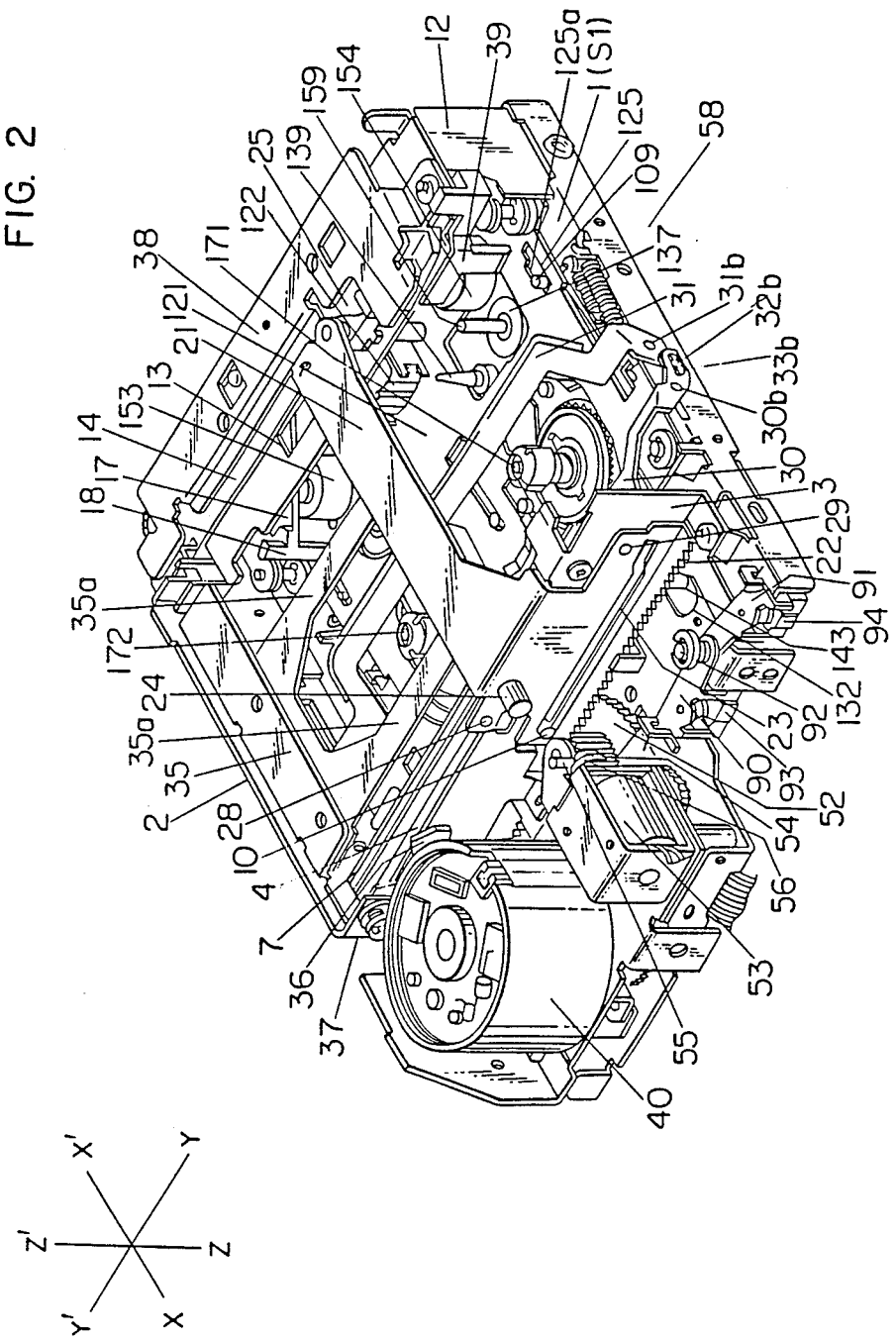
FIG. 2 is a perspective view of the upper side of a cassette magnetic recording and reproducing device.
Figure 3:
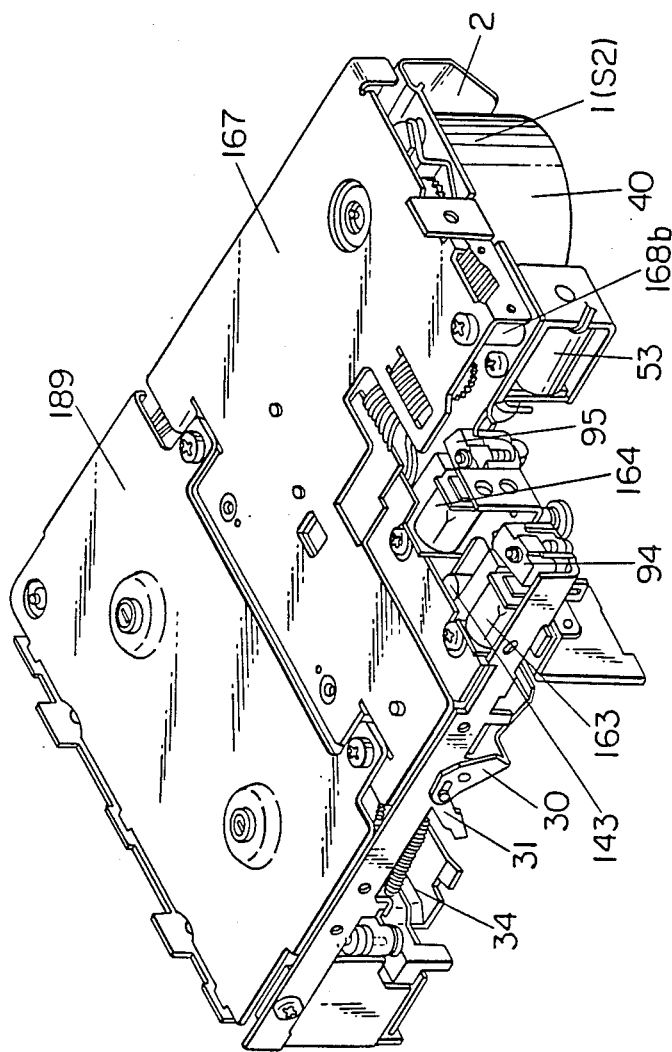
FIG. 3 is a perspective view of the reverse side of the device.
Figure 4:
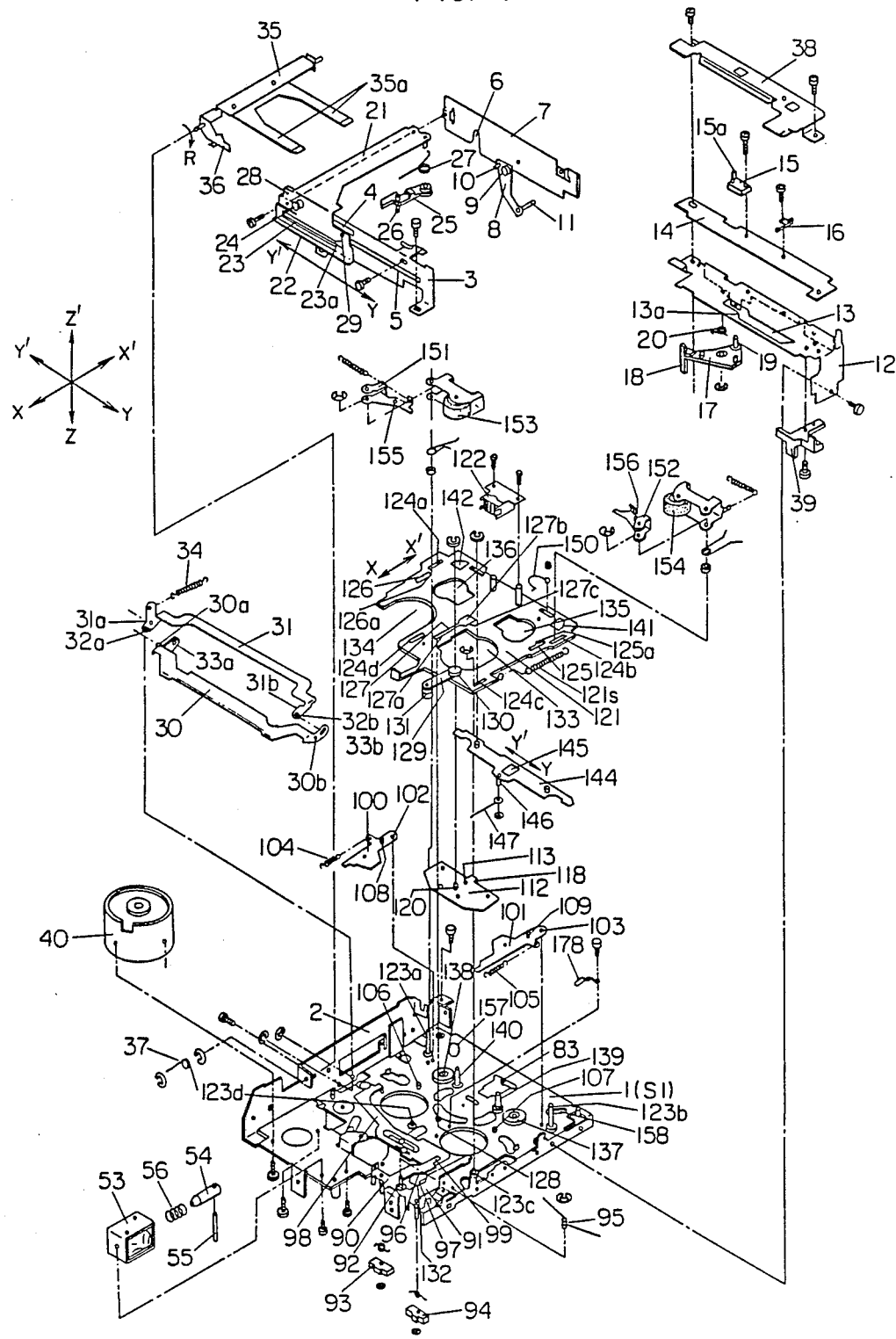
FIG. 4 is an exploded perspective view of the upper side of the device.

In FIGS. 2 and 4 to 8, a reference numeral 1 designates a base plate having an upper surface S1 mounting various mechanisms which will be described hereinunder with reference to FIGS. 2 and 4.

The base plate 1 is bent at a right angle at its rear edge to form a rear panel 2. A reference numeral 3 denotes a side panel secured to the base plate 1 and having guide grooves 4 and 5 which are substantially parallel to the base plate 1, while a notch (not shown) is formed substantially at the center of the lower portion of the side panel 3. A reference numeral 7 designates an auxilary side panel secured to one side of the side panel 3 with a predetermined distance therebetween. A link 8 is rotatably supported by the auxiliary side panel 7 by means of a shaft 9. A pin 10 is provided on one side of the link 8 to be received in the notch (not shown) formed in the side panel 3. A long pin 11 is provided on the other side of the link 8. A reference numeral 6 designates a notch formed in the lower portion of the auxiliary side panel 7 to receive the long pin 11 of the link 8. An L-shaped side panel 12 is fixed to the base plate 1. A cam groove 13 is formed in the upper surface of the side panel 12. A reference numeral 14 designates a printed board fixed to the upper side of the side panel 12. A cassette insertion detecting switch 15 and an ejection detecting switch 16 are secured to the printed board 14. A reference numeral 17 designates a switch lever rotatably secured to the underside of the side panel 12. A cassette detecting piece 18 adapted to be biased by the cassette half is formed on one end of the switch lever 17. An actuator pin 19 for actuating a driving piece 15a of the cassette insertion detecting switch 15 is integrally formed on the other end of the switch lever 17. A reference numeral 20 designated a spring for urging the switch lever 17 counter-clockwise as viewed in FIG. 4. An L-shaped carriage 21 is adapted to slide back and forth (directions of arrows Y and Y') while being guided by the side panels 3 and 12. The carriage is formed with a rack 22 and a cam groove 23 which receives the pin 10. A reference numeral 24 denotes a pin attached to the carriage 21, and a numeral 25 designates a cassette engaging claw pivotally supported on one end of the carriage 21. The cassette engaging claw 25 is provided with a pin 26 which is adapted to be received in the cam groove 13 formed in the upper side panel 12. A reference numeral 27 designates a spring for urging the cassette engaging claw 25 clockwise as viewed in FIG. 4. The biasing force exerted by the spring 27 acts to keep the pin 26 of the cassette engaging claw 25 in contact with the edge of the groove 13 adjacent the side panel 3. The carriage 21 is provided with pins 28 and 29 which are received in the guide grooves 4 and 5 formed in the side panel 3.

Reference numerals 30 and 31 designates substantially U-shaped lifter plates. The lifter plate 31 is provided on the opposite ends thereof with pins 32a, 32b, and the other lifter plate 30 is formed on the opposite ends with elongated holes 33a, 33b. The pins 33a, 32b are received by the elongated holes 33a, 33b. The lifter plate 30 also is provided on both ends thereof with pins 30a, 30b. The pins 30a, 30b are received in holes formed in the base plate 1 so that the lifter plate 30 is pivotally supported by the base plate 1 about the pins 30a, 30b. Similarly, the pins 31a, 31b on the opposite ends of the lifter plate 31 are received in holes formed in the lifter plate 31 so that the lifter plate 31 is pivotally supported by the base plate 1. A reference numeral 34 designates a spring which is retained at its one end by the lifter plate 31 and at the other end by the rear panel 2 of the base plate 1. The lifter plate 31 is biased clockwise as viewed in FIG. 4 by the force of the spring 34. The lifter plates 30 and 31 are connected to each other through engagement between the pins 32a, 32b and the elongated holes 33a, 33b. When the lifter plate 31 is biased by the spring 34 in the clockwise direction, the lifter plate 30 is biased counter-clockwise. The elongated pin 11 of the link 8 pivotally supported on the auxiliary side panel 7 contacts the lower surface of the lifter plate 30 to restrict clockwise rotation of the lifter plate 30.

A reference numeral 35 designates a cassette pressing plate pivotally supported on the rear panel 2 of the base plate 1. A cam 36 is integrally formed on one end of the cassette pressing plate 35. A numeral 35a designates a resilient pressing member attached to the cassette pressing plate 35 which in turn is biased in one direction by a spring 37. When the carriage 21 is moved rearwardly, i.e., in the direction of the arrow Y', the pin 24 provided on the carriage 21 engages with the cam portion 36 of the cassette pressing plate 35 to drivingly torn the cassette pressing plate 35 in the direction of the arrow R against the force of the spring 37. A reference numeral 38 designates a protector plate for protecting the cassette insertion detecting switch 15 and the ejection detecting switch 16, and a numeral 39 denotes a cassette guide member attached to the side panel 12. The arrangement described hereinbefore constitutes a cassette transfer mechanism for automatically transferring the inserted cassette to a reproducing or recording position and automatically transferring the same from the reproducing or recording position to the cassette take-out position.

Figure 9A:
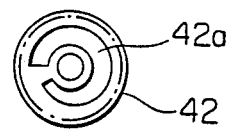
FIGS. 9A and 9B are a top plan view and a bottom plan view of a first gear 42 used in the device.
Figure 9B:
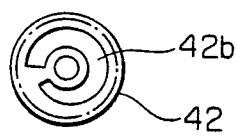
Figure 10A:
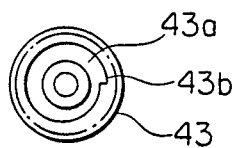
FIG. 10A is a top plan view of a second gear used in the device.
Figure 10B:
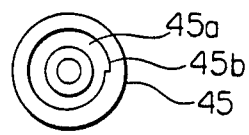
FIG. 10B is a bottom plan view of a pulley 45.

A description will be made hereinunder as to a driving mechanism for driving the cassette transfer mechanism. The driving mechanism is principally disposed on the reverse side S2 of the base plate 1. Referring to FIGS. 5, 6, 7 and 8, a reference numeral 40 denotes a reversible motor provided on the upper side S1 of the base plate 1 and having a shaft 41 which projects downward through a bore formed in the base plate 1 to extend to the reverse side S2 of the base plate 1. A first gear 42 press-fitted on the shaft 41 is provided on the opposite sides thereof with C-shaped grooves 42a, 42b as shown in FIGS. 9A and 9B. The shaft 41 rotatably carries a second gear 43 which is provided on the upper surface thereof with an annular groove 43a having a step 43b in the outer peripheral portion thereof as shown in FIG. 10A. A reference numeral 44 designates a semi-cylindrical claw which is received in the groove 42b formed in the lower surface of the first gear 42 and also in the annular groove 43a formed in the second gear 43. The first gear 42, second gear 43 and the claw 44 in combination constitute a one-way clutch mechanism. As the shaft 41 of the motor 40 rotates clockwise, i.e., in the direction represented by CW in FIG. 5, the torque of the motor 40 is transmitted from the shaft 41 to the second gear 43 through the first gear 42 and the claw 44, so that the second gear 43 rotates in the clockwise direction. However, when the motor shaft 41 rotates counter-clockwise (CCW), the claw 44 does not transmit the torque of the first gear 42 to the second gear 43, so that the second gear 43 is not rotated. A reference numeral 45 designates a pulley rotatably supported by the shaft 41. As will be seen from FIG. 10B, the pulley 45 is formed in the lower surface thereof with an annular groove 45a which has a step 45b on the outer peripheral portion thereof. A semi-cylindrical claw 46 is received both in the groove 42a in the upper surface of the first gear 42 and in the annular groove 45a in the pulley 45. The first gear 42, pulley 45 and the claw 46 in combination constitutes a one-way clutch mechanism. Therefore, when the shaft 41 of the motor 40 rotates counterclockwise, i.e., in the direction of the arrow CCW as viewed in FIG. 5, the torque of the motor 40 is transmitted from the shaft 41 to the pulley 45 through the first gear 42 and the claw 46, so that the pulley 45 rotates counter-clockwise (CCW). However, even when the motor 40 rotates clockwise (CW), the torque of the motor 40 is not transmitted to the pulley 45.

Figure 5:
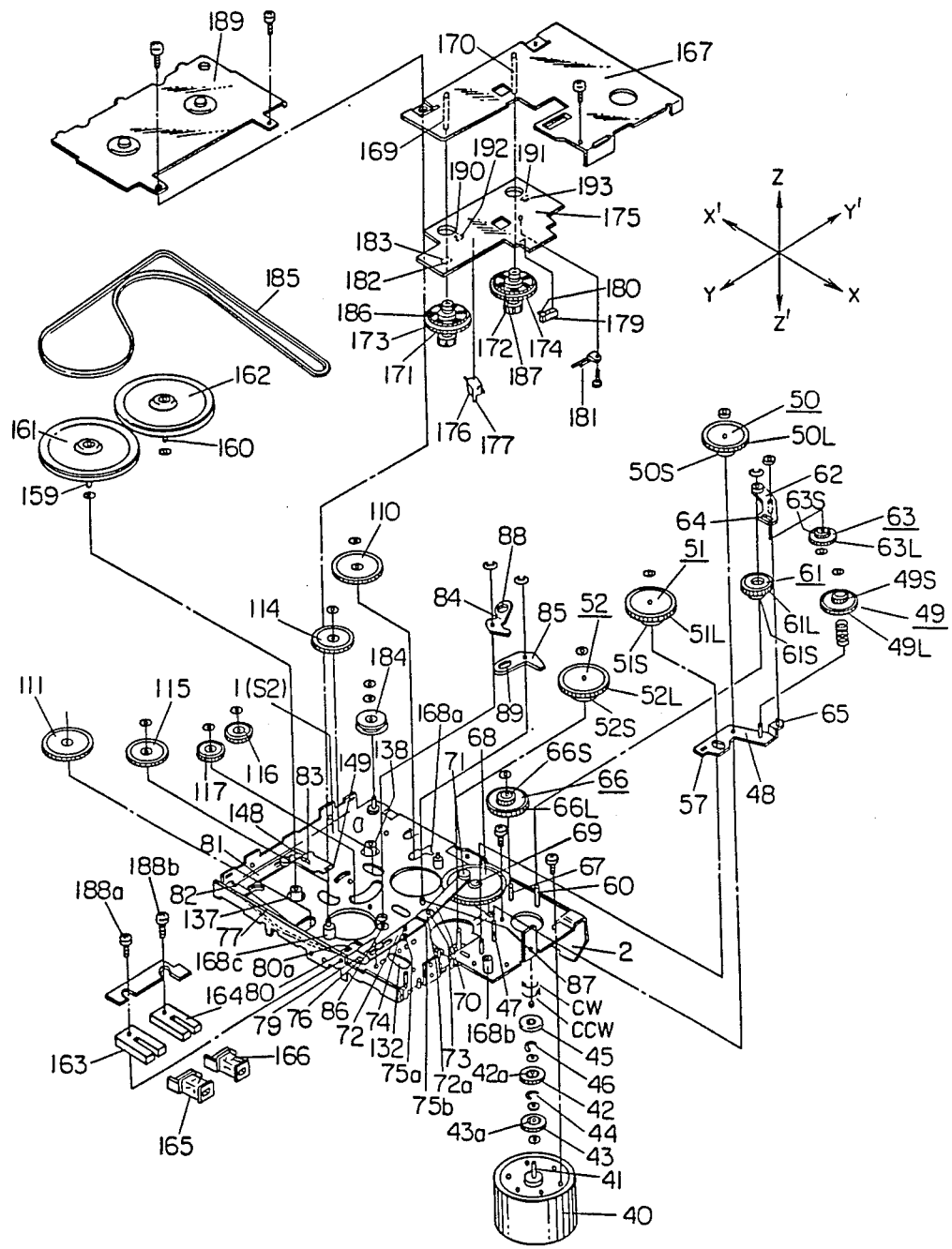
FIG. 5 is an exploded perspective view of the reverse side of the device.
Figure 11A:
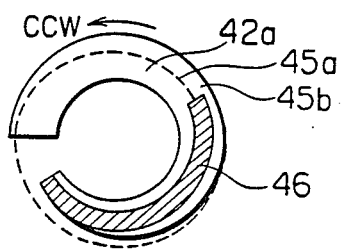
FIGS. 11A and 11B are illustrations of a relationship between a first gear and a pulley and a claw.
Figure 11B:
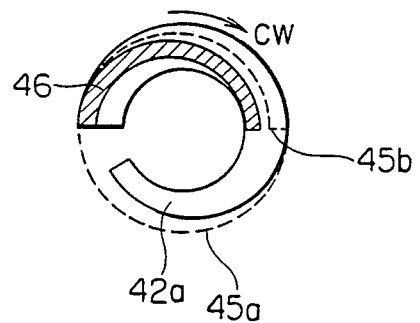

FIGS. 11A and 11B show the relationship between the C-shaped groove 42a in the upper surface of the first gear 42 and the claw 46 and the annular groove 45a in the lower surface of the pulley 45. As seen from FIG. 11A, when the first gear 42 rotates counter-clockwise (CCW), one end of the claw 46 abuts against the step 45b of the annular groove 45a while the other end of the claw 46 abuts against the other end of the C-shaped groove 42. Therefore, the counter-clockwise torque of the first gear 42 is transmitted to the pulley 45 through the claw 46. On the other hand, referring to FIG. 11B which shows the case where the first gear 42 rotates clockwise (CW), one end of the claw 46 abuts against one end of the groove 42 and the other end of the claw 46 does not abut against the step 45b of the annular groove 45a formed in the pulley 45. Therefore, the torque of the first gear 42 is not transmitted to the pulley 45. A reference numeral 47 designates a stationary shaft fixed to the base plate 1 and rotatably supporting a mode clutch lever 48. A reference numeral 49 designates a third gear rotatably supported by the mode clutch lever 48. The third gear 49 has a large-diameter gear portion 49L and a small-diameter gear portion 49S which are integral with each other. Similarly, a fourth gear 50 has a large-diameter gear portion 50L and a small-diameter gear portion 50S which are integral with each other. The large-diameter gear portion 50L constantly meshes with the small-diameter gear portion 49S of the third gear 49. The fourth gear 50 is rotatably carried by the stationary shaft 47. A fifth gear 51 rotatably supported by the base plate 1 has a large-diameter gear portion 51L constantly meshing with the small-diameter gear portion 50S of the fourth gear 50 and a small-diameter gear portion 50S formed integral therewith. Referring to FIG. 5, a reference numeral 52 denotes a sixth gear rotatably supported by the base plate 1. The sixth gear 52 has a large-diameter gear portion 52L constanty meshing with the small-diameter gear portion 51S of the fifth gear 51, and a small-diameter gear portion 52S constantly meshing with the rack 22 of the carriage 21.

Referring to FIG. 4, a reference numeral 53 designates a plunger solenoid fixed to the surface S1 of the base plate 1. The plunger solenoid 53 has a movable iron core 54 on the end of which is press-fit a pin 55. This pin extends to the reverse side S2 through a hole formed in the base plate 1. A numeral 56 denotes a spring for biasing the movable core 54. The pin 55 is received in an elongated hole 57 formed in the mode clutch lever 48. When the plunger solenoid 53 is not electrically energized, the movable iron core 54 is biased by the spring 56 to project beyond the plunger solenoid 53. In consequence, the mode clutch lever 48 is biased clockwise as viewed in FIGS. 5 and 6 through the pin 55, so that the large-diameter gear portion 49L of the third gear 49 and the first gear 42 are disengaged from each other. On the other hand, when the plunger solenoid 53 is energized, it attracts the movable iron core 54. Consequently, the mode clutch lever 48 engaging with the pin 55 of the movable iron core 54 of the plunger solenoid 53 is rotated counter-clockwise as viewed in FIGS. 5 and 6, thereby bringing the large-gear portion 49L of the third gear 49 into engagement with the first gear 42. Therefore, the torque of the motor 40 is transmitted to the carriage 21 through the first gear 42, third gear 49, fourth gear 50, fifth gear 51, sixth gear 52 and the rack 22, thereby shifting the carriage 21 rearwardly, i.e., the direction of the arrow Y' or forwardly, i.e., in the direction of the arrow Y. Namely, as the motor 40 rotates clockwise, the carriage 21 is moved rearwardly (Y'), whereas the counter-clockwise rotation of the motor 40 causes the carriage 21 to shift forwardly (Y).

A description will be made hereinunder as to the operation of the cassette transfer mechanism and the cassette transfer driving mechanism having the described constructions.

When a cassette has not been inserted through the cassette inserting portion 58, the carriage 21 takes a forward position (direction of arrow Y), whereas the lifter plates 30 and 31 are spaced from the base plate 1, leaving small opening angle of the lifter plates 30, 31.

As the cassette is inserted through the cassette insertion portion 58, it presses the cassette detecting piece 18 of the switch lever 17 to rotate the latter. In consequence, the actuator pin 19 of the switch lever 17 presses the driving piece 15a of the cassette insertion detecting switch 15 to close the cassette insertion detecting switch 15, so that, the plunger solenoid 53 is supplied with electric current to attract the movable iron core 54, thereby turning the mode clutch lever 48 counter-clockwise in FIGS. 5 and 6 to engage the third gear 49 with the first gear 42. After elapse of a predetermined period of time, e.g., 100 mS from the closing of the cassette insertion detecting switch 15, electric current is supplied to the motor 40 owing to the control of the control circuit, and the motor 40 rotates clockwise as viewed in FIGS. 5 and 6. The torque of the motor 40 is transmitted to the rack 22 through the first gear 42, third gear 49, fourth gear 50, fifth gear 51 and the sixth gear 52, so that the carriage 21 is moved rearward, i.e., in the direction of the arrow Y', while the cassette remains stationary. A further rearward movement of the carriage 21 causes the cassette engaging claw 25 of the carriage 21 to enough with the edge on the tape-exposing surface of the cassette, so that the cassette is moved rearwardly, i.e., in the direction of the arrow Y', by means of the carriage 21. When the carriage 21 is further moved rearward, the pin 26 of the cassette engaging claw 25 supported by the carriage 21 reaches the bent portion 13a of the cam groove 13 in the side panel 12, so that the cassette engaging claw 25 is rotated to be disengaged from the cassette. At the same time, the pin 24 of the carriage 21 abuts against the cam portion 36 of the cassette pressing plate 35, to turn the cassette pressing plate 35, thereby causing the cassette pressing plate 35 to press the cassette downwardly, i.e., in the direction of an arrow Z. Meanwhile, the lifter plates 30 and 31 are turned in synchronism with the rotation of the cassette pressing plate 35 towards the base plate 1, thus increasing the opening angle of the lifter plates 30, 31. More specifically, an upward bend 23a is formed on one end of the cam groove 23 of the carriage 21, so that the link 8 is rotated when its pin 10 reaches the bend 23a of the cam groove 23 as a result of the rearward movement of the carriage 21 in the direction of the arrow Y'. Consequently, the elongated pin 11 of the link 8 is moved towards the base plate 1, so that the lifter plates 30, 31 having been restricted by the elongated pin 11 are turned by the force of the spring 34 to approach the base plate 1, increasing the opening angle thereof.

Thus, the cassette is transferred horizontally in accordance with the rearward movement of the carriage 21 and a further rearward movement of the carriage 21 disengages the cassette engaging claw 25 from the cassette, while the cassette pressing plate 35 is turned to allow the lifter plates 30 and 31 to turn. Consequently, the cassette having been transferred rearwardly descends and is set in the reproducing or recording position.

Figure 6:
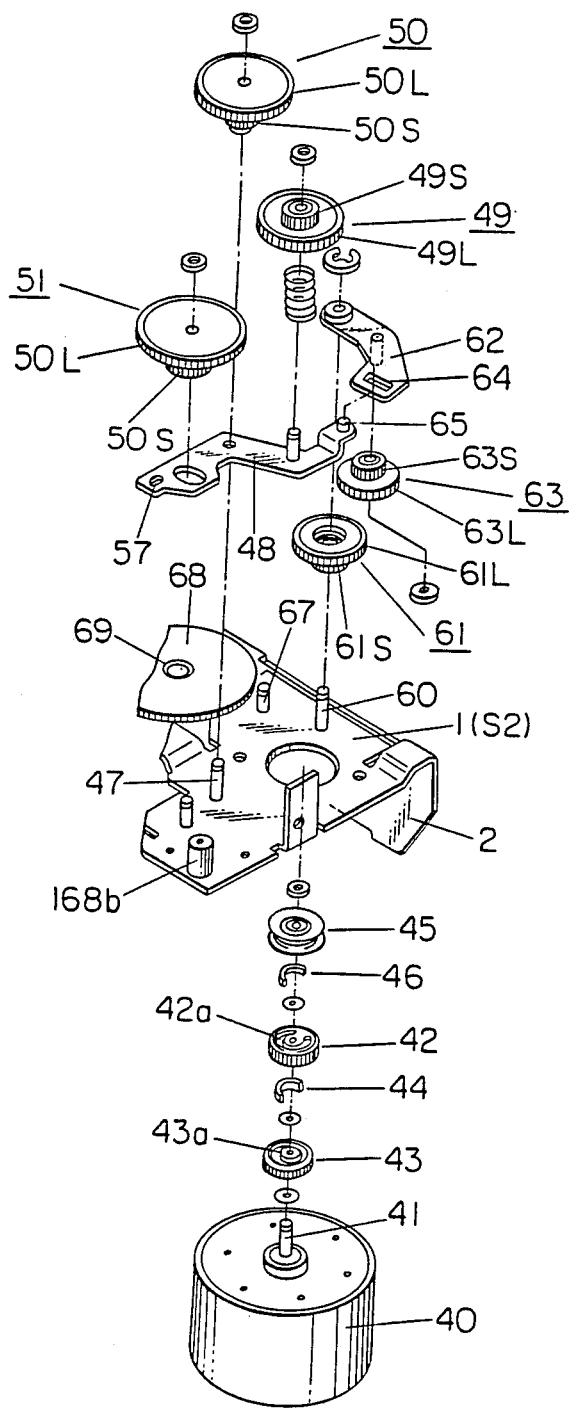
FIG. 6 is an exploded perspective view of a portion of the device around the motor.

When the motor 40 operates counter-clockwise as viewed in FIGS. 5 and 6 with the cassette set in the reproducing or recording position, the above-described operation is reversed: namely, the cassette is first transferred from the reproducing or recording position in the Z' direction and then transferred in the direction Y back to the cassette insertion portion 58 so that the carriage 21 closes the ejection detecting switch 16, thus stopping the rotation of the motor 40.

An explanation will be made hereinunder as to the operation of the magnetic tape running mode switching mechanism.

Figure 7:
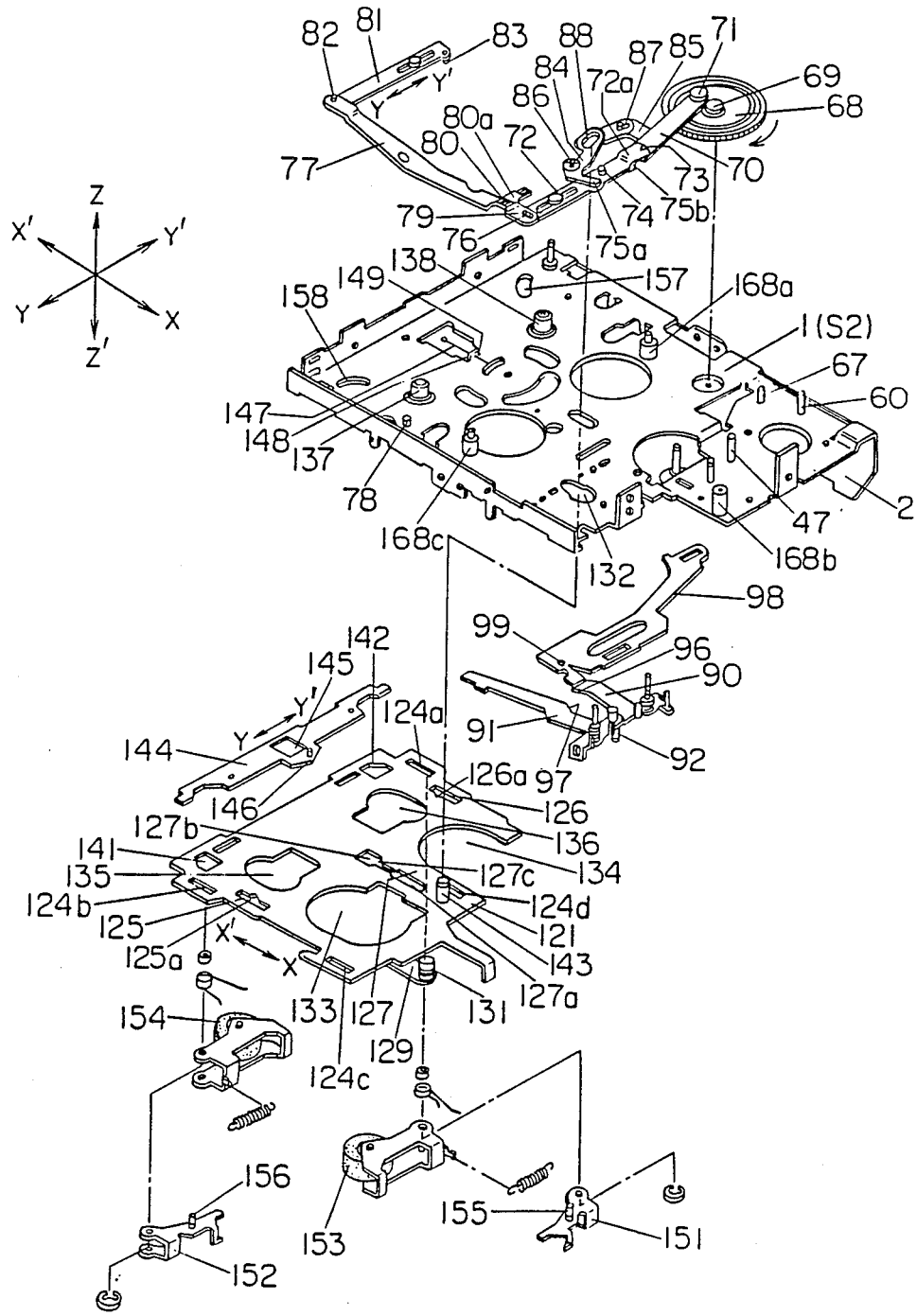
FIG. 7 is an exploded perspective view of a major portion of a tape running mode switching mechanism of the device.
Figure 8:
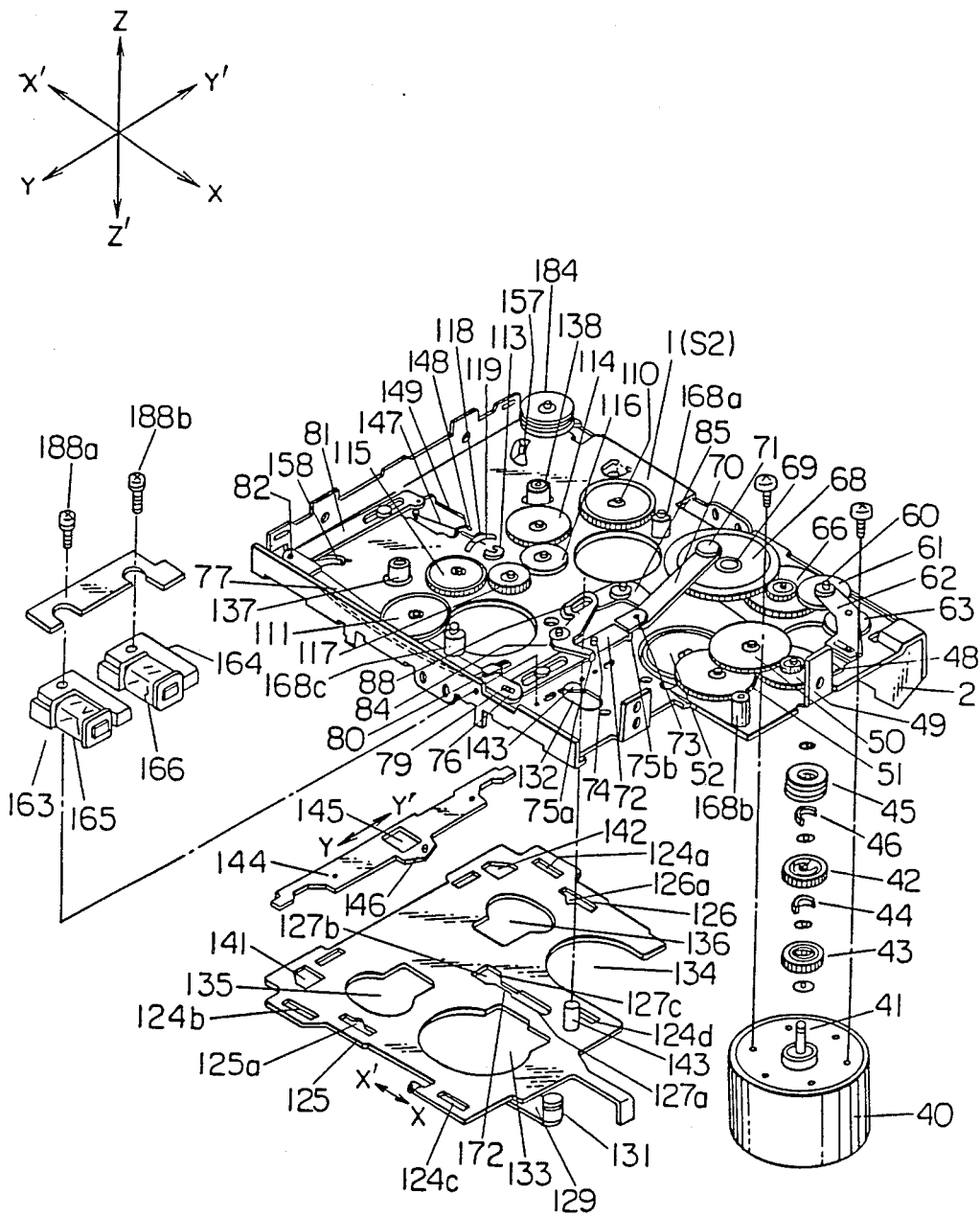
FIG. 8 is an exploded perspective view of a portion of the device.

Referring to FIGS. 4 to 8, a stationary shaft 60 is fixed to the reverse side S2 of the base plate 1, and 61 denotes a seventh gear having a large-diameter gear portion 61L and a small-diameter gear portion 61S formed integral with each other. The seventh gear 61 is rotatably supported by the stationary shaft 60. A reference numeral 62 denotes a clutch lever pivotally supported at its one end on the stationary shaft 60. A shaft provided on the clutch lever 62 rotatably carries an eighth gear 63 having a large-diameter gear portion 63L and a small-diameter gear portion 63S formed integral with each other. The small-diameter gear portion 63S of the eighth gear 63 constantly meshes with the large-diameter portion 61L of the seventh gear 61. A reference numeral 64 designates an elongated hole formed in the free end of the clutch lever 62 and receiving a pin 65 provided on the free end of the mode clutch lever 48. A connection switching mechanism is constituted by the mode clutch lever 48, clutch lever 62, plunger 53, pin 55, third gear 49 and the eighth gear 63 shown in FIG. 6. This connection switching mechanism operates in response to the operation of the plunger solenoid 53 to effect or release the engagement between the third gear 49 and the first gear 42, as well as the engagement between the eighth gear 63 and the second gear 43. A reference numeral 66 designates a ninth gear rotatably supported on a stationary shaft 67 fixed to the reverse side S2 of the base plate 1. The ninth gear 66 has a large-diameter gear portion 66L constantly meshing with the small-diameter gear portion 61S of the seventh gear 61 and a small-diameter gear portion 66S formed integral with the large-diameter gear portion 66L. A reference numeral 68 denotes a tenth gear rotatably supported on a stationary shaft 69 on the base plate 1. The tenth gear 68 constantly meshes with the small-diameter gear portion 66S of the ninth gear 66. In FIGS. 5, 7 and 8, a reference numeral 70 denotes a lever having its one end connected through a pin 71 to a portion of the tenth gear 10 offset from the center of the latter. A slide lever 72 slidably held by the reverse side S2 of the base plate 1 is provided at its one end with a bent portion 72a which is bent in a crank-like form. The bent portion 72a is provided with a pin 73 which is received in a hole formed in the other end of the lever 70. The lever 70 and the slide lever 72 are connected to each other through a pin 73. As the tenth gear 68 rotates, the slide lever 72 is driven by the lever 70 to slide. A reference numeral 74 denotes a pin provided on the slide lever 72, and numerals 75a and 75b denote driving pieces formed on one side of the slide lever 72 integrally therewith. The driving pieces 75a and 75b are bent substantially at a right angle from the major plane of the slide lever 72. A pin 76 is formed on the other end of the slide lever 72. A rotating lever 77 is rotatably carried by a stationary shaft 78 formed on the reverse side S2 of the base plate 1. The rotating lever 77 is provided in one end thereof with an elongated hole 79 for receiving the pin 76 on the slide lever 72. The rotating lever 77 is adapted to turn counter-clockwise or clockwise in response to sliding movement of the slide lever 72 in Y' or Y direction. A black-colored label 80 for detection of position is attached to the rotating lever 77. The label 80 is provided at the center thereof with a light reflecting surface 80a. A lever 81 is connected at its one end through a pin 82 to one end of the rotating lever 77. The lever 81 is adapted to slide in response to the rotation of the rotating lever 77. A numeral 83 designates a pin provided on the free end of the lever 81.

Referring to FIGS. 5, 7 and 8, numerals 84 and 85 denote links pivotally mounted on stationary shafts 86 and 87 provided on the reverse side S2 of the base plate 1. Elongated holes 88 and 89 are formed in one ends of the links 84 and 85. These elongated holes 88, 89 receive a driving pin 143 attached to a head chassis 121 which will be described later. When said slide lever 72 is slid to the left (direction Y in FIGS. 5, 7 and 8), the pin 74 of the slide lever 72 drives the link 84 clockwise, while the link 85 is driven counter-clockwise by the pin 73 of the slide lever 72 as the latter slides to the right (direction Y').

Referring to FIGS. 4, 7 and 14A to 14C, rotating levers 90 and 91 are pivotally mounted on the upper side S1 of the base plate 1. The rotating levers 90, 91 pivotally carry at their one ends attractive members 93, 94 which are adapted to be attracted by an electro-magnet which will be described later. A reference numeral 95 denotes a spring which is supported by the shaft 92 and exerts a biasing force tending to urge the rotating lever 90 clockwise as viewed in FIG. 4. Numerals 96 and 97 denote tapered surfaces formed on the rotating levers 90 and 91. A slide lever 98 slidably supported by the upper side of the base plate 1 has a recess 99 which is engaged by an end of the rotating lever 90. Therefore, the slide lever 98 is adapted to slide in response to the turning movement of the rotating lever 90. Referring to FIG. 4, numerals 100 and 101 denote turning arms pivotally carried by the upper side S1 of the base plate 1 through pins 102 and 103. The turning arms 100 and 101 are rotatable about the pins 102 and 103, and are biased in one directions by springs 104 and 105. The turning movements of the arms 100 and 101 are restricted by projections 106 and 107 formed on the surface S1 of the base plate 1. Reference numerals 108 and 109 denote pins provided on the turning arms 100 and 101, while numerals 110 and 111 denote, respectively, an eleventh gear and a twelfth gear (see FIGS. 5 and 8) which are rotatably carried by the turning arms 100 and 101, respectively. The gears 110 and 111 are positioned on the reverse side S2 of the base plate 1.

Referring to FIG. 4, as the rotating lever 90 is turned counter-clockwise, the slide lever 98 slides to the left, i.e., in the Y' direction, to cause the rotating arm 100 to turn clockwise against the force of the spring 104. On the other hand, when the rotating lever 91 turns clockwise as viewed in FIG. 4, the rotating arm 101 is turned counter-clockwise against the force of the spring 105. A reference numeral 112 designates an idler gear plate pivotally mounted on the upper side S1 of the base plate 1 through a pin 113. The idler gear plate 112 rotatably carries a thirteenth gear 114 and a fourteenth gear 115 of a large diameter and fifteenth gear 116 and sixteenth gear 117 of a small diameter. The thirteenth to sixteenth gears (13 to 16) are positioned on the reverse side S2 of the base plate 1. Meshing engagements are constantly maintained between the thirteenth and fifteenth gears 114 and 116, between the fifteenth and sixteenth gear 116 and 117, and between the sixteenth and fourteenth gears 117 and 115. A reference numeral 118 designates a bent portion formed by bending a portion of the idler gear plate 112 substantially at a right angle. The bent portion 118 extends to the reverse side S2 of the base plate 1 through an arcuate hole. The bent portion 118 is formed with a hole 119. A pin 120 is provided on the idler gear plate 112.

Referring to FIGS. 4, 7 and 8, a numeral 121 denotes a head chassis to which is mounted a magentic head 122. The head chassis 121 is formed with elongated holes 124a, 124b, 124c and 124d which receive stationary shafts 123a, 123b, 123c and 123d. A reference numeral 121S denotes a spring which is retained at its one end by the head chassis 121 and at its other end by the base plate 1. The head chassis 121 is biased by the spring 121S in the X' direction. The above-mentioned head chassis 121 is slidable in the directions X and X' while being guided by the stationary shafts 123a to 123d. Numerals 125 and 126 denote cam holes formed in the head chassis 121. Recesses 125a, 126a are formed in one sides of the cam holes 125, 126. The cam holes 126 and 125 receive, respectively, the pins 108 and 109 of the rotating arms 100 and 101. An opening 127 is formed in the central portion of the head chassis 121. The opening 127 has a narrow elongated portion 127a for receiving the pins 128 on the upper side S1 of the base plate 1, as well as the pin 120 on the idler gear plate 112, a wide angular portion 127b for receiving the pin 120 of the idler gear plate 112, and a tapered portion 127c which connects the narrow elongated portion 127a to the wide angular portion 127b.

A reference numeral 129 denotes an arm pivotally supported by a pin 130. The tip end of the arm 129 rotatably carries a roller 131 which is placed between the rotating levers 90 and 91, and is received in a key-shaped hole 132 to extend to the reverse side S2 of the base plate 1. A reference numeral 133 denotes a hole for receiving one of reel bases which will be described later, while 134 denotes a recess for receiving the other of the reel base. Numerals 135 and 136 denote holes formed in the head chassis 121. These holes receive a later-mentioned capstan shaft, bearings 137, 138 provided on the base plate 1 and tape guide pin 139, 140 fixed to the upper side S1 of the base plate 1.

Numerals 141 and 142 denote holes for receiving pins 155, 156 of later-mentioned pinch roller support arms 151, 152. A drive pin 143 fixed to the head chassis 121 extends to the reverse side S2 of the base plate 1 through a hole formed in the base plate 1 and is received in the elongated holes 88 and 89 formed in the links 84 and 85 mentioned before.

A reference numeral 144 designates a slide plate slidably supported by the head chassis 121. The slide plate 144 slides in the direction Y—Y' perpendicular to the direction X—X' in which the head chassis 121 slides with respect to the base 1. A numeral 145 designates an angular hole formed in the center of the slide plate 144. The angular hole 145 receives the pin 83 on the lever 81, which pin extends through a hole in the base plate 1. A reference numeral 146 designates a support pillar fixed to the slide plate 144. A resilient wire 147 is supported at its one end by the support pillar 146. The resilient wire 147 is received in a hole 149 formed in a bent piece 148 on the reverse side S2 of the base plate 1 and is also received in the hole 119 in the bent portion 118 of the idler gear plate 112. A reference numeral 150 denotes a spring supported at its one end by the slide plate 144 and at its other end by the base plate 1. The spring 150 serves to stably hold the slide plate 144 in the opposite ends of the sliding strokes thereof.

Referring to FIGS. 7 and 8, as the lever 81 slides in the direction of the arrow Y', the slide plate 144 slidably held by the head chassis 121 is slidingly moved in the direction of the arrow Y' by the pin 83 on the lever 81. In consequence, the wire 147 is turned clockwise as viewed in FIG. 7 about the hole 149 in the bent portion 148 of the base plate 1. Therefore, the idler gear plate 112 rotatably held by the base plate 1 is turned counter-clockwise as viewed in FIG. 7 about the pin 113. Conversely, the sliding movement of the lever 81 in the direction of the arrow Y causes the idler gear plate 112 to turn clockwise.

Referring to FIGS. 4 and 7, numerals 151 and 152 denote pinch roller supporting arms pivotally mounted on the stationary shafts 123a, 123b on the upper side S1 of the base plate 1. The pinch roller supporting arms 151 and 152 rotatably support respective pinch rollers 153, 154 and are provided with pins 155, 156, respectively. These pins 155, 156 are received in holes 142, 141 formed in the head chassis 121 and also in holes 157, 158 formed in the base plate 1. As the head chassis 121 moves ahead in the direction X, the pins 155, 156 received in the holes 142, 141 formed in the head chassis 121 are driven so that the pinch roller supporting arms 151, 152 are turned about the stationary shafts 123a, 123b.

Figure 12:
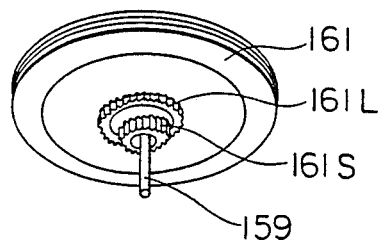
FIG. 12 is a perspective view of a fly-wheel.

Referring to FIG. 5, capstan shafts 159, 160 are rotatably supported by bearings 137, 138 which are secured to the base plate 1. Fly wheels 161, 162 are fixed to one ends of the capstan shafts 159, 160. As shown in FIG. 12, the fly wheels 161, 162 are provided with large diameter gear portions 161L, 162L and small diameter gear portions 161S, 162S, respectively, formed integrally therewith.

The large diameter gear portions 161L, 162L of the fly wheels 161, 162 are engageable, respectively, with the twelfth gear 111 and eleventh gear 110 which are rotatably carried by the rotating arms 101, 100, respectively. On the other hand, the small diameter gears 161S, 162S of the fly wheels 161, 162 are engageable, respectively, with the fourteenth gear 115 and the thirteenth gear 114 which are rotatably supported by the idler gear plate 112. Numerals 163, 164 denote, respectively, U-shaped electromagnets having coils 165, 166. The electromagnets 163, 164 are secured to the reverse side S2 of the base plate 1 by means of small screws 188a, 188b. The attractive members 93, 94 on the rotating levers 90, 91 are disposed in a manner to oppose the end surfaces of the electromagnets 164, 163.

Referring to FIG. 5, a reference numeral 167 denotes a reel support plate secured to posts 168a, 168b, 168c on the reverse side S2 of the base plate 1. Reel bases 171, 172 are rotatably supported by stationary shafts 169, 170 fixed to the reel support plate 167. Numerals 173, 174 denote gear portions of the reel bases 171, 172. The gear portion 173 of one of the reel bases 171 is engaged by the twelfth gear 111 supported by the rotating arm 101 or by the fourteenth gear 115 supported by the idler gear plate 112, while the gear portion 174 of the other reel base 172 is engaged by the eleventh gear 110 on the rotating arm 100 or by the thirteenth gear 114 on the idler gear plate 112. A reference numeral 175 designates a printed circuit board secured to the reel support plate 167. A cassette detecting switch 176, which is adapted to be closed when a cassette is set in a reproducing position (or recording position), is fixed to the printed circuit board 175. The cassette detecting switch 176 has a movable piece 177 which extends to the upper side S1 of the base plate 1 through a hole formed in the base plate 1. A reference numeral 178 designates a flexible plate having its one end fixed to the upper side S1 of the base plate 1. As a cassette is set in the reproducing (or recording) position, it presses the flexible plate 178 which in turn presses the movable piece 177 of the cassette detecting switch 176 to close the cassette detecting switch 176. A reference numeral 179 designates a change-over switch fixed to the printed circuit board 175. The change-over switch 179 has a movable piece 180 which is adapted to be driven and switched by the driving pieces 75a, 75b on the slide lever 72 as the latter slides.

A reference numeral 181 designates a reproduction state detecting switch fixed to the printed circuit board 175. This reproduction state detecting switch 181 is driven and closed by a driving pin 143 provided on the head chassis 121. Numerals 182 and 183 denote, respectively, a light-emitting element and a light-receiving element which are fixed to the printed circuit board 175. The light emitted from the light-emitting element 182 is reflected by the position detecting label 80 to be received by the light-receiving element 183. The position of the rotating lever 77 is detected by measuring the quantity of the light received by the light-receiving element 183. A reference numeral 184 denotes a pulley rotatably supported on a corner of the reverse side S2 of the base plate 1. A belt 185 passes round the pulley 184 rotatably on the base plate 1, pulley 45 rotatably supported by the shaft 41 of the motor 40, and fly wheels 161, 162.

Referring to FIG. 5, circular labels 186, 187 are adhered to the reverse sides of the reel bases 171, 172. Each of the labels 186, 187 is composed of black portions and reflective portions. Light-emitting elements 190, 191 and light-receiving elements 192, 193 are arranged on the printed circuit board 175 in facing relationship with the labels 186, 187 on the reel bases 171, 172.

The light-emitting elements 190, 191 are adapted to emit light to the labels 186, 187. The light reflected by the reflective portions of the labels 186, 187 are received by the light-receiving elements 192 and 193, while blank portions do not reflect the light materially. Therefore, the light-receiving elements 192, 193 produce rectangular wave pulse signals when the reel bases 171, 172 are being rotated. On the other hand, when the reel bases 171, 172 are stationary, the light-receiving elements 192, 193 produce signals of constant levels. A reference numeral 189 designates a lid plate secured to pillars 168a, 168c by means of screws.

FIG. 15 shows a control system which controls the motor 40, plunger solenoid 53 and the electromagnets 163, 164 in accordance with the states of various parts and the operation of various switches.

In FIG. 15, a control circuit 200 includes a central processing unit (CPU), read only memory (ROM) and write/read memory (RAM). The control circuit 200 receives outputs from various detecting means for detecting the states of the constituents parts, i.e., the cassette insertion detecting switch 15, cassette detecting switch 176, reproduction state detecting switch 181, light-receiving elements 183, 192 and 193, change-over switch 179, ejection detecting switch 16, and a non-voice detecting circuit 201.

A reference numeral 202 denotes a first operation switch which is used for stopping the reproducing or recording operation and then ejecting the cassette from the device. A reference numeral 203 denotes a second operation switch which is used for the fast forwarding (FF) of a magnetic tape. A third operation switch 204 is used for fast rewinding the magnetic tape (REW). A reference numeral 205 denotes a fourth operation switch which is used for switching the reproduction from one channel, e.g., side A, to the other channel, e.g., side B, of the magnetic tape. A reference numeral 206 denotes a fifth operation switch which is used for pause, i.e., suspension of reproduction during reproducing operation. A reference numeral 207 denotes a sixth operation switch which is used for selection of music recorded in the magnetic tape. By manipulating the sixth switch 207 along with the manipulation of the second (or third) operation switch 203 or 204, it is possible to automatically select music which is recorded before or behind the music presently played. For instance, when the second switch 203 is depressed three times while the seventh operation switch 207 is operated, the tape is fast forwarded to a third selection of music from the music now under reproduction. The outputs of various detecting means and the outputs of various operation switches mentioned above are input to an input port 208 of the control circuit 200. A reference numeral 209 designates a detecting means for detecting the states of the outputs from various detecting means mentioned above. A reference numeral 210 denotes a mechanism state judging means which judges the state of the mechanical parts on the basis of the result of the detection by the mechanism state detecting means 209. The result of the judgement by the mechanism state judging means 210 is output to the control means 211. A reference numeral 212 denotes a monitoring means for monitoring the state of detection performed by the mechanism state detection means 209. For instance, the monitoring means 212 monitores whether the reproduction has been commenced after elaspse of a predetermined time from the insertion of the cassette. A reference numeral 213 denotes an abnormality judging means for judging, on the basis of the result of the monitoring by the monitoring means 212, whether the operation is normal or not. The result of judgement performed by the abnormality judging means 213 is input to the control means 211. A reference numeral 214 designates a voice/non-voice judging means which judges whether the reproduction output from the magnetic head is continuing for a predetermined period of time. The result of judgement performed by the voice/non-voice judging means 214 is input to the control means 211. A reference numeral 215 designates a key input detecting means for detecting whether operation of various operation switches 202 to 207 has been made, while a numeral 216 denotes a key input judging means which judges the next operation mode on the basis of the result of detection by the key input detecting means 215. The result of judgement of the key input judging means 216 is input to the control means 211 which is adapted to output various signals in response to the outputs from various means 213, 210, 214 and 216 mentioned above. The control signal is applied through the output port 217 to the motor driving circuit 218, plunger driving circuit 219, and electromagnet driving circuits 220, 210, thereby controlling the motor 40, plunger solenoids 53 and the electromagnets 163, 164.

Figure 22:
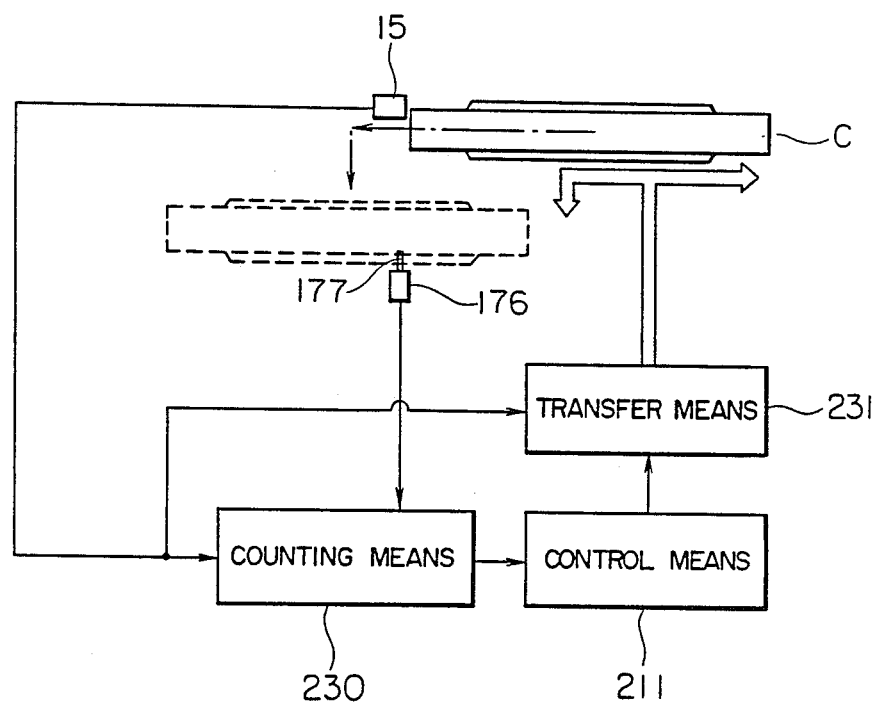
FIG. 22 is a schematic view of a mechanism for ejecting a cassette when the same is not correctly set.

FIG. 22 schematically shows the arrangement for detecting whether the cassette has been safely transferred to the recording or reproducing position and for ejecting the cassette when it has not been safely transferred.

Referring to FIG. 22, the cassette insertion detecting switch 15 is adapted to be actuated by the switch lever 17 when the cassette C is inserted to the cassette insertion portion 58. As this cassette insertion detecting switch 15 is closed, a counting means 230 starts to count clock signals. The closing of the cassette insertion detecting switch 15 also activates a transfer means 231 which is composed of the motor 40, first gear 42, third gear 49, fourth gear 50, fifth gear 51, sixth gear 52 and the carriage 21, whereby the cassette is transferred both in the horizontal and vertical directions. When the cassette C is transferred to the recording or reproducing position, it directly operates the cassette detecting switch 176 to close the latter which in turn resets the counting means 230. Thus, the counting means 230 does not output any overflow signal, on condition that the cassette detecting switch 176 is closed within a predetermined period of time, e.g., 2.5 seconds, from the closing of the cassette insertion detecting switch 15. However, if the cassette detecting switch 176 is not closed within a predetermined period of time from the closing of the cassette insertion detecting switch 15, the counting means 230 outputs an overflow signal to the control means 231. The control means 211 controls, upon receipt of the overflow signal, the transfer means 231 to eject the cassette C to the cassette insertion portion 58. Thus, in the described embodiment, when the cassette C is not correctly set in the recording or reproducing position within a predetermined period of time from the insertion of the cassette C, it is judged that any trouble has been caused during the transfer of the cassette, and an operation is executed to eject the cassette.

The operation of the described embodiment is as follows.

Figure 16:
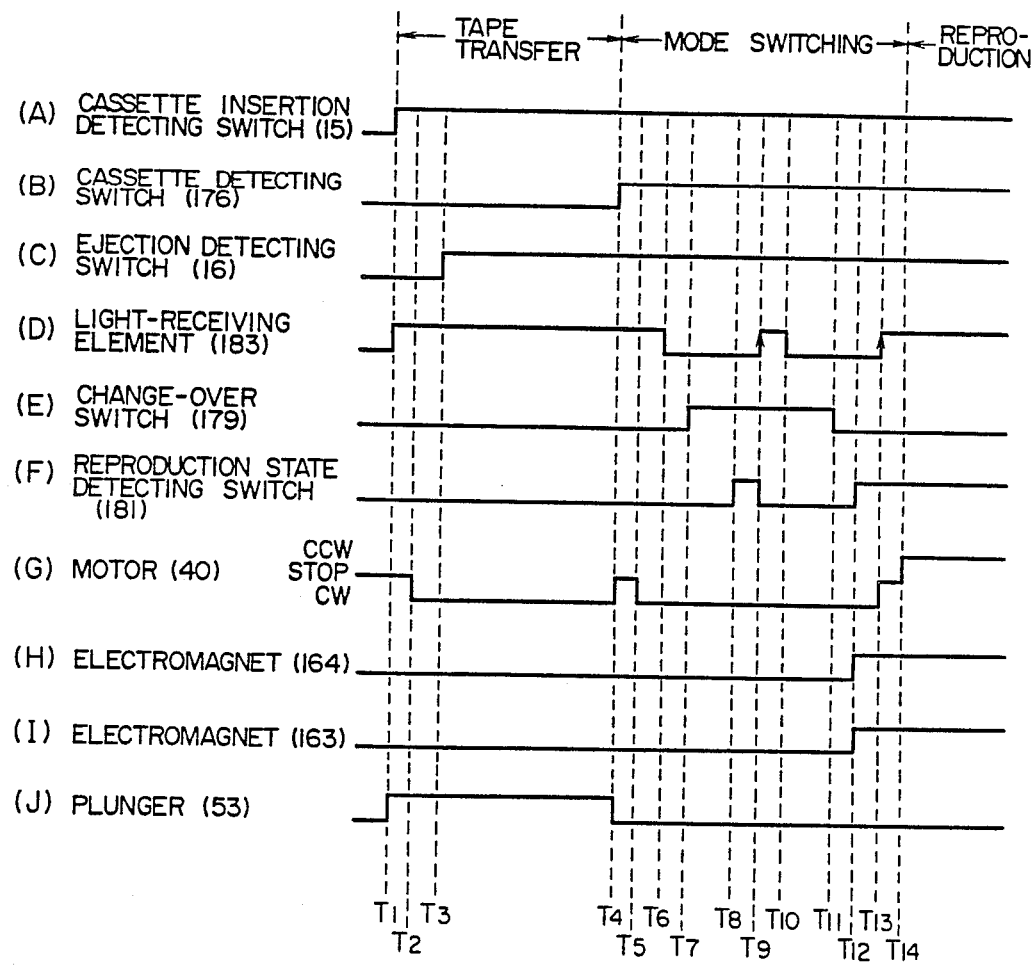
FIGS. 16 to 21 are timing charts illustrating operations of the device.

(A) Insertion of cassette through the cassette insertion portion 58 and transfer of the same to the recording or reproducing position (see timing chart in FIG. 16)

As the cassette is inserted into the cassette insertion portion 58, it pushes the cassette detecting piece 18 to rotate the same clockwise, so that the cassette insertion detecting switch 15 is closed, i.e., turned on, at a moment $T_1$ in FIG. 16. As a result, the plunger solenoid 53 is supplied with electric current, so that the movable iron core 54 of the plunger solenoid 53 is attracted against the biasing force of the spring 56. The movement of the movable iron core 54 causes the mode clutch lever 48 to be driven by the pin 55 on the movable iron core 54, so that the mode clutch lever 48 is turned, whereby the large-diameter gear portion 49L of the third gear 49 rotatably supported on the mode clutch lever 48 is caused to mesh with the first gear 42 press-fitted on the shaft 41 of the motor 40. When a predetermined period of time, e.g., about 100 ms, has elapsed after the closing of the cassette insertion detecting switch 15, electric current is supplied to the motor 40 at a moment $T_2$ in FIG. 16, so that the shaft 41 of the motor 40 is rotated counter-clockwise (CW). The torque of the motor 40 is then transmitted to the rack 22 of the carriage 21 through the first gear 42, third gear 49, fourth gear 50, fifth gear 51 and the sixth gear 52, so that the carriage 21 is moved rearwardly, i.e., in the Y′ direction, while the cassette remains stationary. As the carriage 21 is transferred to a predetermined position, the cassette engaging claw 25 of the carriage 21 engages with the edge of the hole in the tape-exposing surface of the cassette, so that the cassette is transferred rearwardly, i.e., in the Y′ direction, together with the carriage 21.

As the carriage 21 is further moved rearwardly, the pin 24 of the carriage 21 abuts against the cam portion 36 of the cassette pressing plate 35 to rotate the cassette pressing plate 35 in the direction of the arrow R in FIG. 4. Meanwhile, the pin 10 inserted into the cam groove 23 in the carriage 21 is moved to the bent portion 23a of the cam groove 23. In consequence, the link 8 is rotated, so that the long pin 11 fixed to the link 8 is moved towards the base plate 1. As the result, the lifter plates 30, 31 having been prevented by the elongated pin 11 from turning towards the base plate 1 are allowed to turn towards the base plate 1. The turning movement of the cassette pressing plate 35 and the turning movement of the lifter plates 30, 31 in combination cause the cassette to be moved towards the base plate 1, i.e., in the Z direction, from the rearward position to which it has been moved. As the cassette descends towards the base plate to a predetermined position in response to the turning movement of the cassette pressing plate 35 and the lifter plates 30, 31, the flexible plate 178 is pressed by the cassette to drive the movable piece 177 of the cassette detecting switch 176, thereby closing this switch at a moment $T_4$ in FIG. 16, to enable confirming the setting of the cassette in the reproducing position.

The setting of the inserted cassette in the reproducing position is thus completed.

(B) Running of a magnetic tape in a cassette set in reproducing position (see timing chart in FIG. 16)

When cassette half is set in the reproducing position and the cassette detecting switch 176 is closed, the power supply to the motor 40 is interrupted to stop the motor 40 while suspending the power supply to the plunger solenoid 53. In consequence, the movable iron core 54 of the plunger solenoid 53 is extracted outwardly by the biasing force of the spring 56, and the mode clutch lever 48 is turned clockwise, thereby disengaging the third gear 49 from the first gear 42.

The clockwise movement of the mode clutch lever 48 causes a clockwise movement of the clutch lever 62 connected to the mode clutch lever 48, so that the large-diameter gear portion 63L of the eighth gear 63 rotatably supported on the clutch lever 62 is caused to mesh with the second gear 43.

After an elapse of a predetermined period of time, e.g., 100 mS from the closing of the cassette detecting switch 176, the power supply to the motor 40 is commenced at a moment $T_3$ in FIG. 16, to rotate the motor 40 in the clockwise direction (CW).

Figure 13A:
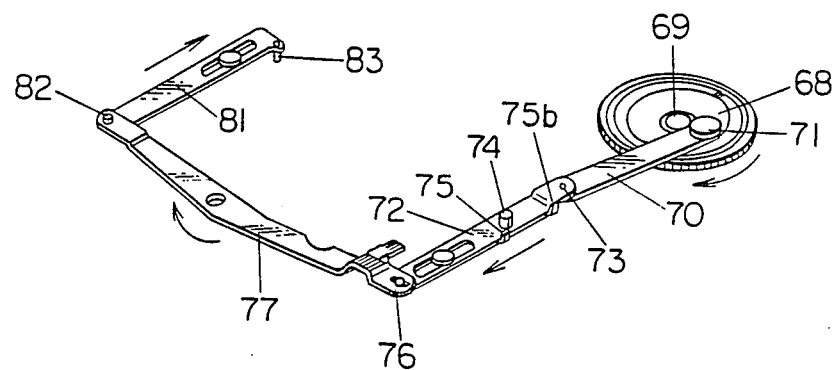
FIGS. 13A and 13B are illustrations showing an operation of a portion of a magnetic tape running mode switching mechanism.

As the motor 40 operates in the clockwise direction, the torque of the motor 40 is transmitted from the shaft 41 to the tenth gear 68 through the first gear 42, claw 44, second gear 43, eighth gear 63, seventh gear 61 and the ninth gear 66, so that the tenth gea 68 is rotated clockwise from the position shown in FIG. 13A. The clockwise rotation of the tenth gear 10 causes the lever 70 to move, thereby causing the slide lever slidably supported on the base plate 1 to slide in the Y direction.

As the slide lever 72 slides in the Y direction, the pin 74 provided thereon abuts against the link 84 and causes this link 84 to turn clockwise (see FIG. 7). Since the actuator pin 143 fixed to the head chassis 121 is received in the elongated hole 88 formed in the link 84, the clockwise movement of the link 84 drives the actuator pin 143 to cause movement of the head chassis 121 in the direction of the arrow X against the force of the spring 121S. As the slide lever 72 further slides in the Y direction, the output level from the light-receiving element 183 is lowered at a moment $T_6$ in FIG. 16, so that the movable piece 180 of the change-over switch 179 is driven in the Y direction by the action of the driving piece 75b on the slide lever 72, whereby the change-over switch 179 is switched at a moment $T_7$ in FIG. 16. As the tenth gear 68 is rotated clockwise through about 90° from the position shown in FIG. 13A, the actuator pin 143 having been driven by the link 84 in the direction of the arrow X abuts against the reproducing state detecting switch 181 to close the same at a moment $T_8$ shown in FIG. 16. A further clockwise rotation of the tenth gear 68 causes the slide lever 72, which has slid in the Y direction, to begin sliding movement in the Y' direction, while the link 84 starts to turn counter-clockwise. Consequently, the reproduction state detecting switch 181 is opened to increase the output level from the light-emitting element 183 at a moment $T_9$ in FIG. 16. However, the output level from the light-receiving element 183 is lowered at a moment $T_{10}$ in FIG. 16, as a result of a further sliding movement of the slide lever 72 in the Y' direction. A further clockwise movement of the slide lever 72 past the state shown in FIG. 13B brings the pin 73 on the slide lever 72 into contact with the link 85 to turn the link 85 counter-clockwise, thereby driving the actuator pin 143 on the head chassis 121 again in the direction of the arrow X.

Figure 13B:
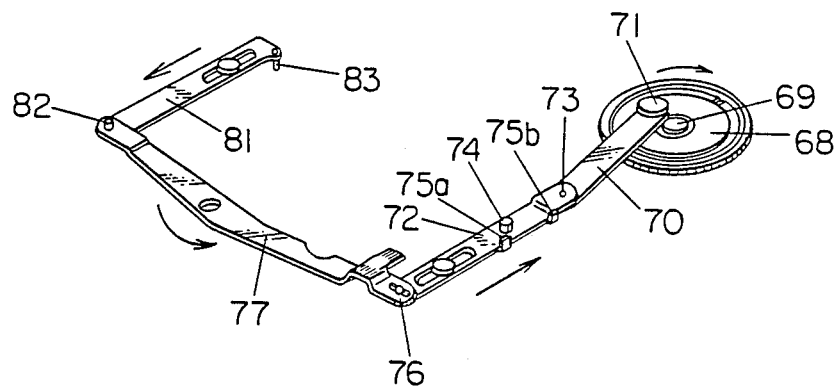

As the tenth gear 68 rotates clockwise from the state shown in FIG. 13B, the change-over switch 179 is switched by the driving piece 75a on the slide lever 72 at a moment $T_{11}$ in FIG. 16. As the tenth gear 68 further rotates through about 90° from the state shown in FIG. 13B, the actuator pin 143 again closes the reproducing state detecting switch 181, so that the electromagnets 163 and 164 are supplied with electric currents at a moment $T_{12}$ in FIG. 16.

Figure 14C:
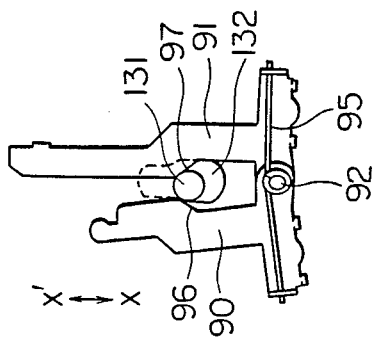
FIGS. 14A, 14B and 14C are illustrations showing an operation of a rotary lever used in the device.
Figure 14B:
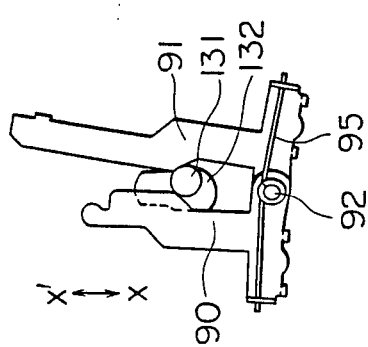
Figure 14A:
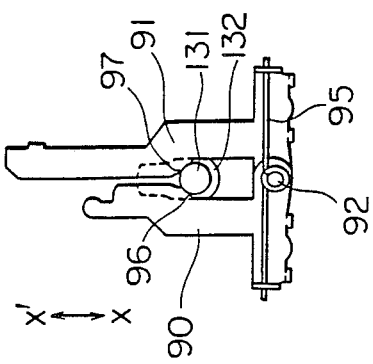

As the electromagnets 163, 164 are energized, the attractive members 93, 94 on the rotating levers 90, 91 are attracted by the electromagnets 164, 163, so that the rotating levers 90, 91 are held in the opened position as shown in FIG. 14A. In this state, the tenth gear 68 further rotates clockwise, so that the slide lever 72 starts to slide to the left again, thereby allowing the link 85 to rotate clockwise. However, since the roller 131 of the head chassis 121 is restricted in position by rotating levers 90, 91 which have been held in the closed position, the head chassis 121 cannot return in the direction of the arrow X' owing to the action of the biasing force of the spring 121S. When the tenth gear 68 has completed one full rotation from the state shown in FIG. 13A, the output level from the light-receiving element 183 is increased again at a moment $T_{13}$ in FIG. 16. The power supply to the motor 40 is suspended in response to this second rise of the output from the light-receiving element 183, so that the motor 40 stops to rotate. When a predetermined period of time, e.g., 100 mS, has elapsed from the moment $T_{13}$ of the second rise of the output from the light-receiving element 183, the motor 40 starts to rotate counter-clockwise at a moment $T_{14}$ in FIG. 16.

The movement of the head chassis 121 in the direction of the arrow X causes movement of the pins 155, 156 received in the holes 141, 142 in the head chassis 121, and the pinch roller supporting arms 151, 152 are rotated to bring the pinch rollers 153, 154 closer to the capstan shafts 159, 160. Meanwhile, the magnetic head 122 mounted on the head chassis 121 is moved towards the magnetic tape in the cassette.

While the tenth gear 68 makes one full clockwise rotation from the state shown in FIG. 13A, the lever 81 connected to the slide lever 72 through the rotating lever 71 reciprocates one time right and left. Therefore, the slide plate 144 is driven by the pin 83 on the lever 81 first leftwardly, i.e., in the Y direction, and then rightwardly, i.e., in the Y' direction and lastly leftwardly. When the tenth gear 68 returns to the original position after one full rotation, the slide plate 144 has been moved to the left position, i.e., in the Y direction. As described before, the pillar 146 on the slide plate 144 retains one end of the resilient wire 147 which is received in the hole 149 of the bent portion 148 of the base plate 1 with its other end received in the hole 119 formed in the bent portion 118 of the idler gear plate 112. Therefore, when the slide plate 144 is moved to the left, i.e., in the Y direction, the wire 147 has been rotated clockwise as viewed in FIGS. 7 and 8 about the bent portion 148 of the base plate 1. In this state, the idler gear plate 112 is rotated clockwise, so that the fourteenth gear 115 rotatably supported on the idler gear plate 112 meshes with the small-diameter gear portion 161S of the flywheel 161, while the thirteenth gear 114 rotatably supported on the idler gear plate 112 meshes with the gear portion 174 of the reel base 172.

When the tenth gear 68 has completed rotation through 360° from the position shown in FIG. 13A, the turning moments of the rotating arm 100 and the rotating arm 101, which are caused by the biasing forces of the springs 104, 105, are limited by the engagement between the pins 108, 109 on the rotating arms 104, 105 and the cam holes 125, 126 in the head chassis 121. Therefore, in the state shown in FIG. 13A, the eleventh and twelfth gears 110, 111 rotatably supported by the rotating arms 100, 101 do not mesh with the large-diameter gear portions 161L, 162L of the flywheels 161, 162 and the gears 173, 174 of the reel bases 171, 172.

As will be understood from the foregoing description, when the tenth gear 68 has been returned to the original position after rotation through 360° at the moment $T_{13}$ in FIG. 16, the following states of the constituent parts have been achieved:

(a) The head chassis 121 is held in the position where it is in the direction of the arrow X.

(b) The magnetic tape in the cassette is put between the pinch roller and the capstan shaft and is contacted by the magnetic head.

(c) Engagement between the small-diameter gear portion 161S of the flywheel 161 and the fourteenth gear 115, as well as the engagement between the thirteenth gear 114 and the gear portion 174 of the reel base 172, is effected.

(d) The eleventh gear 110 and the twelfth gear 111 neither mesh with the large-diameter gear portions 162L, 161L of the flywheels 162, 161 nor with the gear portions 174, 173 of the reel bases 172, 171.

(e) The motor 40 stops to rotate clockwise.

When a predetermined period of time, e.g., about 100 mS, has passes since this moment $T_{13}$, electric current is supplied to the motor 40 at a moment $T_{14}$ in FIG. 16 to rotate the motor 40 counter-clockwise. Then, the counter-clockwise torque of the motor 40 is transmitted from the first gear 42 to the flywheels 161, 162 through the first gear 42, claw 46, pulley 45, belt 185 and the pulley 184, so that the flywheel 161 rotates counter-clockwise and the flywheel 162 rotates clockwise.

The torque of the flywheel 161 is transmitted to the fourteenth gear 115 meshing with the small-diameter gear 161S of the flywheel 161 and is further transmitted to the gear portion 174 of the reel base 172 through the sixteenth gear 117, fifteenth gear 116 and the thirteenth gear 114, thereby causing the reel base 172 to rotate clockwise. In consequence, the reel contained in the cassette and engaging with the reel base 172, rotates clockwise to run the magnetic tape in the cassette, thus conducting the reproducing on the side A of the tape.

Figure 17:
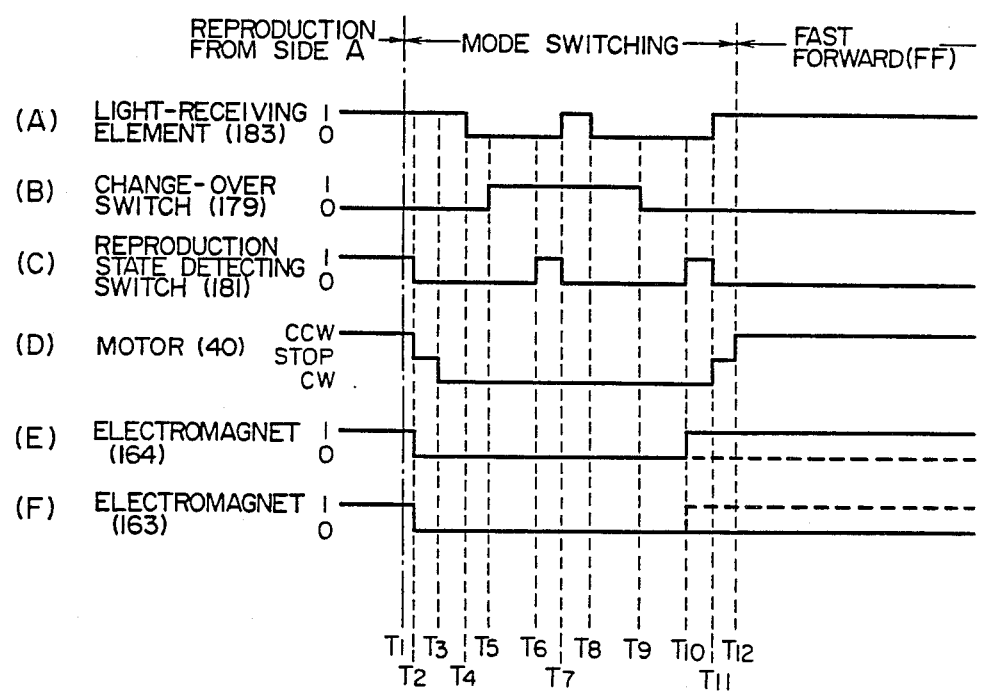

(C) Switching of the mode from reproduction of the side A of the tape to fast forwarding FF (see time chart in FIG. 17)

At a moment $T_1$ in FIG. 17, the operation switch 203 for the fast forwarding FF is operated during reproduction on side A of the tape and the counter-clockwise operation of the motor 40 is then stopped and, at the same time, the supply of power to the electromagnets 163, 164 is suspended at a moment $T_2$ in FIG. 17. Therefore, the attractive members 94, 93, having been magnetically attracted by the electromagnets 163, 164 are released, so that the rotating levers 90, 91 are allowed to rotate. As the result, the roller 131 having been prevented by the rotary levers 90, 91 from moving in the direction X' is moved in this direction by the biasing force of the spring 121S, so that the reproduction state detecting switch 181 is opened, i.e., turned off, at the same moment $T_2$ in FIG. 17. When a predetermined period of time, e.g., 100 mS has elapsed since the moment $T_2$, the motor 40 starts again to rotate in the clockwise direction, at a moment $T_3$ in FIG. 17, so that the tenth gear 68 makes one full rotation clockwise. At a moment $T_{10}$ during one full rotation of the tenth gear 68, i.e., when the head chassis 121 is driven in the direction of the arrow X to close the reproduction state detecting switch 181, electric current is supplied only to the electromagnet 164. Then, the operation of the motor 40 is stopped at a moment $T_{11}$ at which the output from the light-receiving element 183 rises. A detailed description will be made as to the behaviour of the roller 131 during the period between the moments $T_{10}$ and $T_{11}$. At the moment $T_{10}$, the roller 131 has been moved fully in the X direction as shown in FIG. 14A. In this state, the electromagnet 164 is supplied with electric current to attract the attractive member 93, thus restricting the rotation of the rotating lever 90. However, since the other electromagnet 163 is not energized, the rotating lever 91 is allowed to rotate. Then, the link 85 is rotated clockwise in response to the rotation of the tenth gear 68, and the head chassis 121 is moved in the direction of the arrow X'. The roller 131 also is moved in response to the movement of the head chassis 121. However, since only the rotating lever 91 is made rotatable, the roller 131 moves along the inclined surface 96 of the rotating lever 90 to cause rotation of the rotating lever 91. In this state, the movement of the roller 131 in the direction of the arrow X' is prevented by the edge of the key-hole shaped hole 132 in the base plate 1 and the inclined surface 96 of the rotating lever 90, as seen from FIG. 14B.

In the state shown in FIG. 14B, the head chassis has been moved slightly rearwardly from the state shown in FIG. 14A, so as to realize so-called half-touch condition between the magnetic head 122 and the magnetic tape.

The rotation of the rotating lever 91 caused by the roller 131 in turn causes the rotating arm 101 to be rotated clockwise, so that the twelfth gear 111 rotatably supported by the rotating arm 101 is disengaged from the gear portion 173 of the reel base 171 and the large-diameter gear portion 161L of the flywheel 161. On the other hand, the pin 108 of the rotating arm 100 is moved into the recess 126a in the cam hole 126 of the head chassis 121, so that the eleventh gear 110 supported by the rotating arm 100 meshes with the gear portion 174 of the reel base 172 and the large-diameter gear portion 126L of the flywheel 162. In this state, the pin 120 on the idler gear plate 112 has been received in the elongated hole 127a in the head chassis 121, so that the thirteenth and fourteenth gears 114 and 115 on the idler gear plate 112 neither mesh with the gear portions 174, 173 of the reel bases 172, 171 nor with the small-diameter gear portions 162S, 161S of the flywheels 162, 161. The motor 40 is then stopped at the moment $T_{11}$.

When a predetermined period of time, e.g., 100 mS, has elapsed since the suspension of the motor 40, the motor 40 starts to rotate counter-clockwise at a moment $T_{12}$ in FIG. 17, and the driving torque is transmitted to the flywheels 161, 162 through the belt 185 and the torque of the flywheel 162 is further transmitted to the gear portion 174 of the reel base 172 through the large-diameter gear portion 162L of the flywheel 162 and the eleventh gear 110, thereby fast forwarding the magnetic tape.

(D) Switching of operation mode from reproduction from the side A of the tape to quick rewinding (REW) (see timing chart in FIG. 17).

When the rewinding operation switch 204 is operated during the reproduction from the side A of the tape, the operation mode is switched to the rewinding operation. This switching is conducted substantially in the same manner as the switching to the fast forwarding operation FF from the reproduction from the side A of the tape described in connection with FIG. 17. The only point of difference resides in that only the electromagnet 163 is supplied with electric current at the moment $T_{10}$. Namely, as only the electromagnet 163 is energized at the moment $T_{10}$ in FIG. 17, the attractive member 94 is attracted by the electromagnet 163, so that the rotating lever 91 is prevented from rotating, whereas the rotating lever 90 is allowed to rotate. In consequence, the roller 131 acts to rotate the rotating lever 90 clockwise as viewed in FIG. 7, during the movement of the roller 131 in the X' direction. As the result, the rotating arm 100 is turned by means of the slide lever 98, and the eleventh gear 110 supported by the rotating arm 100 is disengaged from the gear portion 174 of the reel base 172 and the large-diameter gear portion 162L of the flywheel 162. In this state, the pin 109 of the rotating arm 101 enters in the recess 125 in the cam hole 125 of the head chassis 121, so that the twelfth gear 111 supported by the rotating arm 101 is caused to mesh with the gear portion 173 of the reel base 171 and the large-diameter gear portion 161L of the flywheel 161. Consequently, as the motor 40 starts to rotate counter-clockwise at the moment $T_{12}$ in FIG. 12, the torque of the motor 40 is transmitted to the reel base 171 through the belt 185, flywheel 161, twelfth gear 111 and the reel base 171, thus effecting the rewinding operation (REW).

Figure 18:
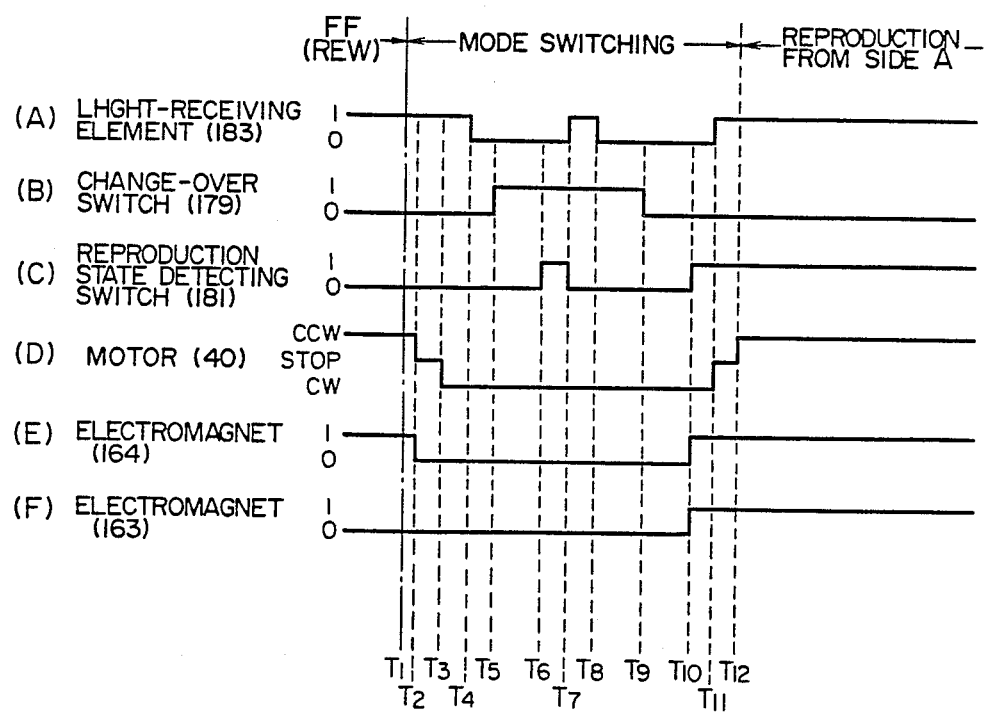

(E) Switching from fast forwarding (FF) of the side A of the tape to reproduction on the side A (see timing chart in FIG. 18)

To stop the fast forwarding (FF) of the side A of the tape, the operation switch STOP 202 for stopping is manipulated at a moment $T_1$ in FIG. 18 to stop the rotation of the motor 40 and to cut off the power supply to the electromagnet 164, at a moment $T_2$ in FIG. 18. When a predetermined period of time, e.g., about 100 mS, has elapsed theresince, the motor 40 is supplied with electric current to rotate in the clockwise direction at a moment $T_3$ in FIG. 18. As the result, the tenth gear 68 makes one full rotation and stops at a moment $T_{10}$ in FIG. 18. Meanwhile, at a moment $T_9$ in FIG. 18, the reproduction state detecting switch 181 is closed to supply electric current to the electromagnets 163, 164. Consequently, the roller 131 is prevented from moving in the direction of the arrow X' by the rotating levers 90, 91, so that the head chassis 121 is held in the reproducing position. Therefore, the reproduction from the side A of the tape is commenced as the motor 40 starts to rotate counter-clockwise at a moment $T_{12}$ in FIG. 18.

Figure 19:
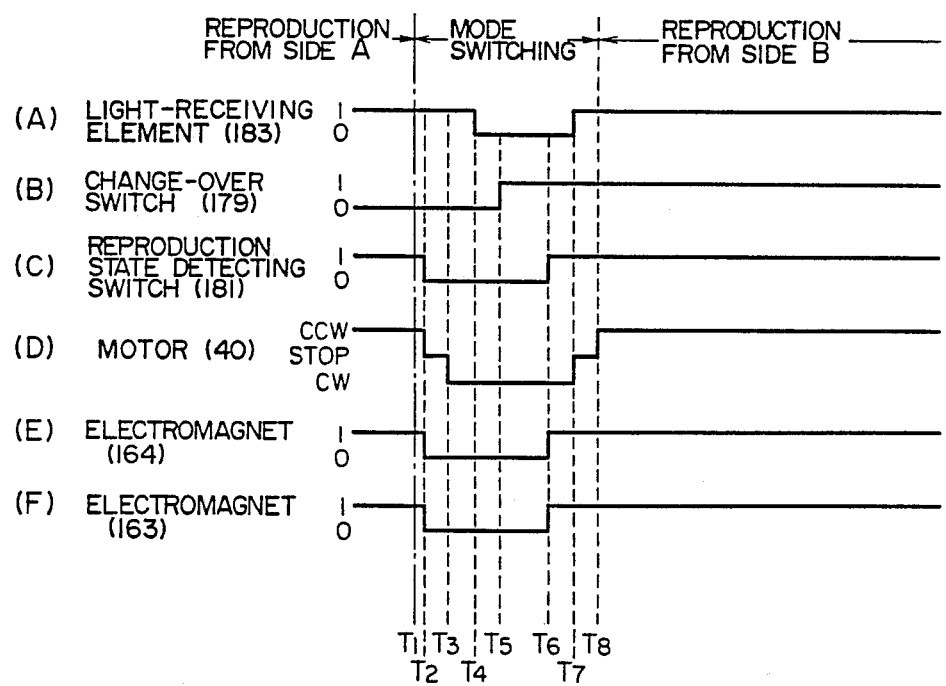

(F) Switching from reproduction on the side A of the tape to reproduction on the side B of the tape (see timing chart in FIG. 19)

During reproduction on the side A of the tape, the operation switch 205 for changing-over the program is manipulated at a moment $T_1$ in FIG. 19. At a moment $T_2$ after the elapse of a predetermined period of time, the motor 40 is stopped and, at the same time, the electric current to the electromagnets 163, 164 is cut off. When a predetermined period of time, e.g., 100 mS, has elapsed theresince, the motor 40 is supplied with electric current again and starts to rotate clockwise at a moment $T_3$ in FIG. 19. As the result, the tenth gear 68 rotates clockwise through about 180° and then stops at a moment $T_7$. Meanwhile, the change-over switch 179 is switched at a moment $T_5$ and the reproduction state detecting switch 181 is closed at a moment $T_6$ to supply electric current to the electromagnets 163, 164. During the time internal between the moments $T_3$ and $T_4$, the tenth gear 68 rotates through about 180° from the state shown in FIG. 13A to the state shown in FIG. 13B. Meanwhile, the slide plate 144 slidably supported by the head chassis 121 is driven to the right, i.e., in the Y' direction, by the pin 83 of the lever 81. Consequently, the idler gear plate 112 is driven counter-clockwise, so that the thirteenth gear 114 on the idler gear plate 112 is caused to mesh with the small-diameter gear portion 162S of the flywheel 162, while the fourteenth gear 115 meshes with the gear portion 173 of the reel base 171. Therefore, as the motor 40 rotates in the counter-clockwise direction at a moment $T_8$ in FIG. 19, the torque of the motor 40 is transmitted to the reel base 171 through the belt 185, flywheel 162, thirteenth gear 114, fifteenth gear 116, sixteenth gear 117 and the fourteenth gear 115, thereby running the magnetic tape to effect the reproduction on the side B of the tape.

Figure 20:
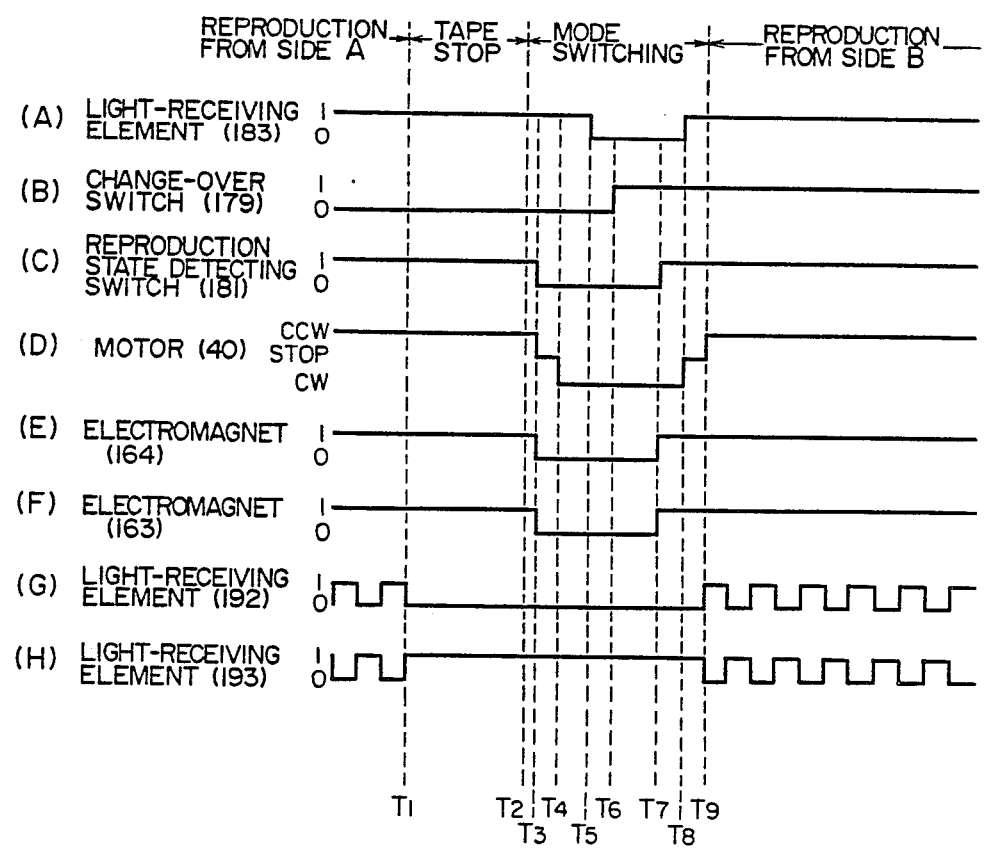

(G) Switching to reproduction on the side B after completion of reproduction on the side A (see timing chart in FIG. 20)

As shown in FIG. 20, during the reproduction on the side A of the tape, the reel bases 171, 172 are rotating and rectangular wave signals are being output from the light-receiving element 192. As the reproduction on the side A is completed at a moment $T_1$ in FIG. 20, the reel bases 171, 172 stop to rotate, so that the light-receiving element 192 does not produce any rectangular wave signals. During the reproduction on the side A of the tape, the timer of the control circuit is reset each time the output from the light-receiving element 192 falls. When the rotation of the reel base 171 is stopped and resetting of the timer is not enabled, the timer commences counting up. When a predetermined number is counted by the timer, the supply of electric current to the motor 40 is cut off to stop the motor 40 and the supply of electric current to the electromagnets 163, 164 is also cut off at a moment $T_2$ in FIG. 20. In consequence, the roller 131 having been prevented from moving in the direction of the arrow X' by the rotating levers 90, 91, is moved in the direction of the arrow X' together with the head chassis 121 by the force of the spring 121S. As the result, the reproduction state detecting switch 181 is opened and, after the elapse of a predetermined period of time, electric current is supplied to the motor 40 to rotate the same in the clockwise direction at a moment $T_3$ in FIG. 20.

Consequently, the tenth gear 68 rotates clockwise through about 180° and stops at a moment $T_7$. Meanwhile, the change-over switch 179 is switched at a moment $T_5$ and the reproduction state detecting switch 181 is closed at a moment $T_6$ to supply electric current to the electromagnets 163, 164. During the clockwise rotation of the tenth gear 68 through about 180°, the slide plate 144 slidably supported by the head chassis 121 is driven to the right, i.e., in the Y' direction, by the pin 83 on the lever 81, so that the idler gear plate 112 is driven counter-clockwise by the wire 147, and the thirteenth gear 114 and the fourteenth gear 115 are caused to mesh with the small-diameter gear portion 162S of the flywheel 162 and the gear portion 173 of the reel base 171, respectively. As the motor 40 rotates counter-clockwise at the moment $T_8$, its torque is transmitted to the reel base 171 through the belt 185, flywheel 162, thirteenth gear 114, fifteenth gear 116, sixteenth gear 117 and the fourteenth gear 115, thereby commencing the reproduction on the side B of the tape.

Figure 21:
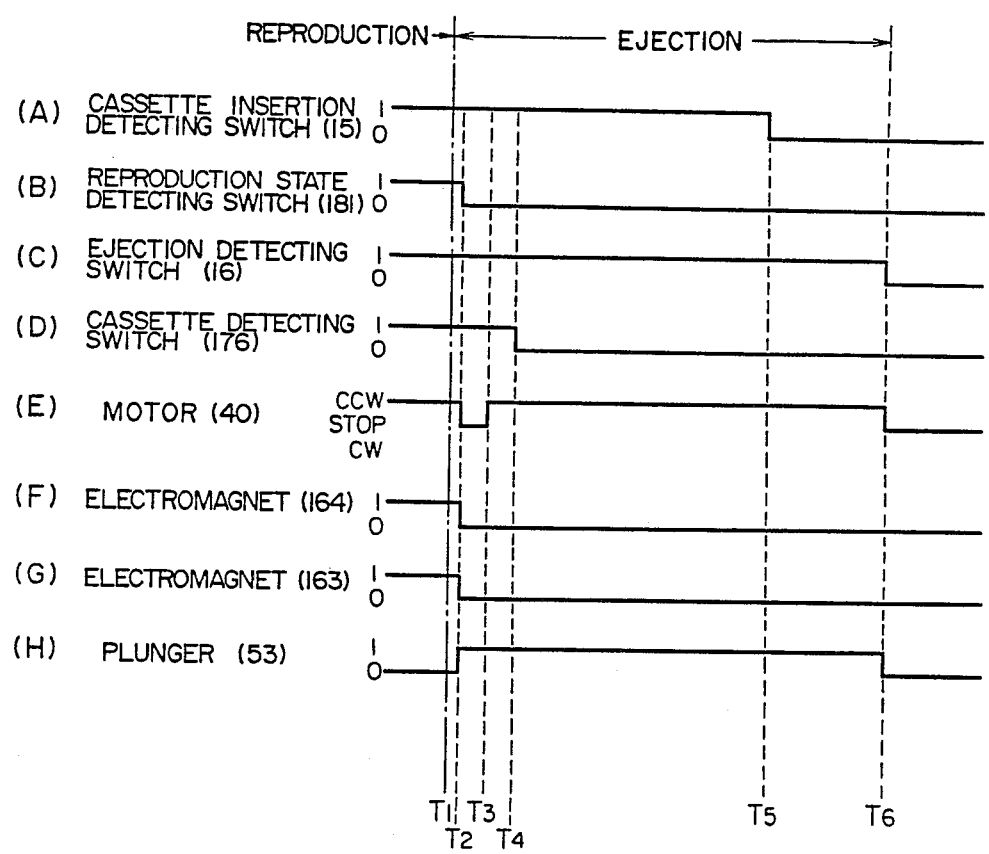

(H) Stopping of reproduction on the side A or B followed by ejection of the cassette half (see timing chart in FIG. 21)

When the operation switch for ejection EJECTION 202 is manipulated during reproduction on the side A or B at a moment $T_1$ in FIG. 21, the motor 40 is stopped after the elapse of a predetermined period of time and the power supply to the electromagnets 163, 164 is cut off at a moment $T_2$ in FIG. 21. Therefore, the head chassis 121 is moved in the direction of the arrow X' to close the reproduction state detecting switch 181. In addition, since the plunger solenoid 53 is supplied with electric current at a moment $T_2$, the mode clutch lever 48 is turned counter-clockwise to turn the clutch lever 62 counter-clockwise. Therefore, the third gear 49 supported by the mode clutch lever 48 meshes with the first gear 42 fixed to the shaft 41 of the motor 40, while the large-diameter gear portion 63L of the eighth gear 63 supported by the clutch lever 62 is disengated from the second gear 43. Then, after the elapse of a predetermined period of time, e.g., 100 mS from the moment $T_2$, the motor 40 starts to rotate in the counter-clockwise direction at a moment $T_3$ in FIG. 21. As the result, the torque of the motor 40 is transmitted to the rack 22 through the third gear 49, fourth gear 50, fifth gear 51 and the sixth gear 52 to move the carriage 21 in the direction of the arrow Y. The movement of the carriage 21 in the direction of the arrow Y causes the cassette pressing plate 35 to turn and the link 8 is turned clockwise, so that the lifter plates 30, 31 are turned away from the base plate 1, i.e., in the direction in which the opening angle between the lifter plates 30 and 31 is reduced. So, the cassette is moved away from the base plate 1. Consequently, the cassette detecting switch 176 is opened, i.e., turned off, at a moment $T_4$ in FIG. 21. Thereafter, the cassette is moved in the direction of the arrow Y by the carriage 21 to open the cassette insertion detecting switch 15 at a moment $T_5$, and, then to open the ejection detecting switch 16 at a moment $T_6$, so that the supply of electric current to the motor 40 is cut off and supply of electric currents to the plunger solenoid 53 is cut off, thus completing the ejecting operation. Other actions in this switching operation are materially identical to those in the operation described before, so that no detailed description will be needed in this connection.

As will be understood from the foregoing description, the present invention provides a magnetic recording and reproducing device in which the operations for transferring a cassette, running of the magnetic tape and the switching of the magnetic tape running modes are effected by a single motor.

The invention also offers various avantages as follows.

According to the invention, the lifter plates which are swingable towards and away from each other are urged by a resilient member away from each other. During the transfer of the cassette in the horizontal direction, the urging of the lifter plates away from each other is stopped by means of a pin, whereas, when the cassette is transferred vertically, the stopping by the pin is dismissed so as to allow the lifter plates to swing away from each other by the force of the resilient member. In consequence, the vertical transfer of the cassette can be conducted without applying any substantial force to the cassette, so that the deformation of the cassette is avoided advantageously.

According to the invention, the slide plate adapted for switching the magnetic tape running direction is connected through the resilient wire to the idler gear plate carrying idler gears engaging with the gears on the reel bases. Therefore, the construction of the running direction switching mechanism is simplified and the fluctuation in the sizes of the constituent parts of this mechanism is effectively absorbed by the resilient force of the wire. In addition, the resilient force of the wire ensures safe engagement between the gears on the idler gear plate and the gears on the reel bases advantageously.

Furthermore, according to the invention, the reciprocating slide mechanism which reciprocates by the power of the motor is utilized as a part of the head chassis driving mechanism and also as a part of the running direction switching mechanism, so that the construction of the whole mechanism is simplified advantageously. Furthermore, according to the invention, the head chassis can be directly located in the reproduction or recording position by the action of a pair of rotating levers. The rotating levers also operate to hold the head chassis at a position slightly retracted from the reproducing or recording position during fast forwarding operation FF and rewinding operation REW. Consequently, the locating precision can be improved advantageously.

Finally, the cassette is automatically ejected when the cassette has not been transferred to the reproducing or recording position within a predetermined period of time after the insertion, so that the cassette and other associated mechanical parts are protected from any damaging force in the event of a trouble during setting of the cassette into the reproducing or recording position.

What is claimed is:

1. A magnetic recording and reproducing device comprising: a reversible motor; a magnetic tape running mechanism for effecting running of a magnetic tape in a cassette by using the torque of said motor during forward operation of said motor; a cassette transfer mechanism for transferring said cassette from a cassette insertion hole to a recording or reproducing position and vice versa by making use of the torque of said motor during forward and backward operation of said motor, respectively; and a magnetic tape running mode switching mechanism for switching the direction of the magnetic tape running mode by making use of the torque of said motor during backward operation of said motor.

2. A magnetic recording and reproducing device according to claim 1, further comprising a slidable head chassis mounting a magnetic head and adapted to be driven by said magnetic tape running mode switching mechanism.

3. A magnetic recording and reproducing device according to claim 1, further comprising: a reciprocating sliding mechanism for converting the rotating motion of said motor into reciprocating sliding motion; a slidable head chassis mounting a magnetic head; a link mechanism interconnecting said reciprocating sliding mechanism and said head chassis; and a tape running direction switching mechanism for switching the running direction of said magnetic tape in response to the operation of said reciprocating sliding mechanism.

4. A magnetic recording and reproducing device according to claim 1, further comprising: a first rotating member fixed to the shaft of said motor; a second rotating member and a third rotating member rotatably carried by the shaft of said motor; a first one-way clutch mechanism for transmitting the torque of said first rotating member to said second rotating member only when said motor is operating in the forward direction; a second one-way clutch mechanism for transmitting the torque of said first rotating member to said third rotating member only when said motor is operating in the backward direction; said cassette transfer mechanism adapted to operate by the torque derived from said first rotating member; said magnetic tape running mode switching mechanism adapted to operate by the torque derived from said second rotating member; and said magnetic tape running mechanism adapted to operate by the torque derived from said third rotating member.

5. A magnetic recording and reproducing device according to claim 4, further comprising a control mechanism which is adapted for disengaging said cassette transfer mechanism from said first rotating member when said magnetic tape running mode switching mechanism is connected to said second rotating member, and for disengaging said magnetic tape running mode switching mechanism from said second rotating member when said cassette transfer mechanism is connected to said first rotating member.

6. A magnetic tape recording and reproducing device according to claim 1, wherein said cassette transfer mechanism includes a pair of lifter plates provided on a base plate so as to be swingable towards and away from each other; a resilient member for biasing said lifter plates away from each other; a cassette transferring carriage provided on a side panel of said base plate; a carriage driving mechanism for driving said carriage; a link pivotally supported by said side panel and having a pin for preventing the turning movement of said lifter plates; and a cassette pressing plate pivotally supported by said base plate; wherein the sliding movement of said carriage causes turning movement of said link and said cassette pressing plate in the direction perpendicular to the direction of transfer of said cassette by said carriage.

7. A magnetic recording and reproducing device according to claim 1, wherein said magnetic tape running mode switching mechanism includes an idler gear plate pivotally supported by a base plate; a first opening formed in a bent portion of said idler gear plate; a head chassis slidably supported by said base plate; a slide plate slidably mounted on said head chassis; a second opening formed in said bent piece on said base plate; and a resilient wire having one end retained by said slide plate and the other end received in said first opening through said second opening; wherein said idler gear plate is turned in accordance with the direction of sliding of said slide plate so as to transmit the torque of a motor to a first reel base or a second reel base through gears on said idler gear plate.

8. A magnetic recording and reproducing device according to claim 1, further comprising: a head chassis adapted to be driven by said magnetic tape running mode switching mechanism; a resilient member for biasing said head chassis in one direction; an engaging member provided on said head chassis; a pair of rotating levers supported to be able to swing towards and away from each other and capable of holding said engaging member against the force of said resilient member; attractive members provided on said respective rotating levers; a pair of electromagnets for attracting said respective attractive members so as to hold said respective rotating levers towards each other; and a control means for controlling the supply of electric power to said electromagnets.

9. A magnetic recording and reproducing device according to claim 8, further comprising a magnetic tape fast forwarding direction control mechanism adapted to operate in response to the movement of said rotating levers.

10. A magnetic recording and reproducing device according to claim 14, wherein said rotating levers swingable towards and away from each other are provided at their opposing portions with inclined surfaces, while said base plate is provided with an opening for receiving said engaging member on said head chassis, such that said engaging member biased by a biasing member is retained by said inclined surfaces of said pair of rotating levers which have been swung towards each other, thereby holding said magnetic head on said head chassis at the reproducing or recording position, and wherein, in the fast forwarding FF or rewinding REW operation mode, said engaging member on said head chassis is retained by the cooperation between said inclined surface of one of said rotating levers which is still in the position swung towards the other and the edge of said opening in said base plate.

11. A magnetic recording and reproducing device according to claim 1, further comprising: a first switch means adapted to be turned on by a cassette inserted into the device; a second switch means adapted to be operated by said cassette transfered by said cassette transfer means; a counting means for counting the time after the driving of said first switch means; and a control means adapted for controlling said cassette transfer means to eject said cassette when said second switch means is not operated until a predetermined period of time is counted by said counting means.

* * * * *